(12) United States Patent
Mansour et al.

(10) Patent No.: US 7,580,946 B2
(45) Date of Patent: Aug. 25, 2009

(54) SMART INTEGRATION ENGINE AND METADATA-ORIENTED ARCHITECTURE FOR AUTOMATIC EII AND BUSINESS INTEGRATION

(75) Inventors: Rabia Mansour, Ramle (IL); Munir Badir, Kefar-Qassem (IL); Majed Amer, Kefar-Qassem (IL); Talea Sarsour, Kefar-Qassem (IL); Naila Badir, Kefar-Qassem (IL)

(73) Assignee: Bizweel Ltd., Ramle (IL)

( * ) Notice: Subject to any disclaimer, the term of this patent is extended or adjusted under 35 U.S.C. 154(b) by 0 days.

(21) Appl. No.: 11/836,164

(22) Filed: Aug. 9, 2007

(65) Prior Publication Data
US 2008/0082569 A1  Apr. 3, 2008

Related U.S. Application Data

(60) Provisional application No. 60/836,952, filed on Aug. 11, 2006.

(51) Int. Cl.
*G06F 17/30* (2006.01)
(52) U.S. Cl. .................................. 707/102; 707/10
(58) Field of Classification Search ............ 707/10, 707/102
See application file for complete search history.

(56) References Cited

U.S. PATENT DOCUMENTS 6,078,924 A * 6/2000 Ainsbury et al. ............ 707/101
6,125,363 A * 9/2000 Buzzeo et al. ............... 707/100
6,134,559 A * 10/2000 Brumme et al. ........ 707/103 R
6,317,749 B1   11/2001 Ghatate (Continued)

OTHER PUBLICATIONS

Jin et al., "Sanitizing using metadata in MetaXQuery", Proceedings of the 2005 ACM symposium on Applied computing table of contents, p. 1732-1736 [online] Mar. 2005. Retrieved from theInternet:<URL:http://portal.acm.org/ft_gateway.cfm?id=1067067&type=pdf&coll=ACM&dl=ACM&CFID=38844079&CFTOKEN=56809751>.*

(Continued)

*Primary Examiner*—Jean B. Fleurantin
*Assistant Examiner*—Dennis Myint
(74) *Attorney, Agent, or Firm*—Mark M. Friedman

(57) ABSTRACT

The present invention discloses systems and methods for automating the EII, using a smart integration engine based on metadata. On-line execution (i.e. data access, retrieval, or update) is automated by integrating heterogeneous data sources via a centralized smart engine based on metadata of all data sources managed in a metadata repository. The data-source assets are mapped to business metadata (terminology) giving programmers the ability to use business terms, and overcome technical terms. IT departments can use the business-level terms for easy and fast programming of all services "at the business level". The integration is performed by the engine (via pre-configuration) automatically, dynamically, and on-line, regardless of topology or technology changes, without user or administrator intervention. MDOA is a high-level concept in which the metadata maps the technical low-level terms to business high-level terms. MDOA is used for seamless integration of a fully-distributed organization with many data sources and technologies.

27 Claims, 13 Drawing Sheets

U.S. PATENT DOCUMENTS

| | | | |
|---|---|---|---|
| 6,810,429 | B1 | 10/2004 | Walsh et al. |
| 6,988,109 | B2 * | 1/2006 | Stanley et al. ............ 707/103 Y |
| 7,152,090 | B2 | 12/2006 | Amirisetty et al. |
| 7,249,286 | B1 * | 7/2007 | Krishnan ..................... 714/39 |
| 2002/0184527 | A1 * | 12/2002 | Chun et al. ................. 713/201 |
| 2003/0236838 | A1 * | 12/2003 | Ouchi ........................ 709/205 |
| 2004/0082179 | A1 | 4/2004 | Saito et al. |
| 2005/0125419 | A1 * | 6/2005 | Mizutani et al. .............. 707/10 |
| 2006/0294153 | A1 * | 12/2006 | Kumar et al. ............... 707/200 |
| 2007/0055691 | A1 | 3/2007 | Statchuk |
| 2007/0239718 | A1 * | 10/2007 | Baxter et al. ................... 707/8 |
| 2008/0140494 | A1 * | 6/2008 | Charuk et al. ................. 705/8 |

OTHER PUBLICATIONS

Gianolli, Patricia et. al., "Data sharing in the Hyperion peer database system", Proceedings of the 31st international conference on Very large data bases table of contents, p. 1291-1294 [online] Aug. 2005. Retrieved from the Internet:<URL: http://portal.acm.org/ft_gateway.cfm?id=1083753&type=pdf&coll=ACM&dl=ACM&CFID=38844079&CFTOKEN=56809751>.*

\* cited by examiner

SMART INTEGRATION ENGINE AND METADATA-ORIENTED ARCHITECTURE FOR AUTOMATIC EII AND BUSINESS INTEGRATION

This patent application claims priority under 35 U.S.C. §119(e) to U.S. Provisional Application No. 60/836,952, filed Aug. 11, 2006, which is hereby incorporated by reference in its entirety.

FIELD AND BACKGROUND OF THE INVENTION

The present invention relates to systems and methods for automatic data integration among multiple heterogeneous data sources. The present invention relates to Service-Oriented Architecture (SOA) and the Enterprise Information Integration (EII) domain combined with Business Process Management (BPM) tools. The present invention focuses on automating integration, and centralizing the "user view" using business level terms.

Data processing and publishing is still one of the most complicated issues information technology (IT) organizations face. Current integration solutions axe expensive, time consuming, and rigid. Such solutions are based on static and IT-dependent services (provided by IT developers using customized technology). Such solutions miss the huge potential of the metadata to automate the EII. Typically, knowledge of business processes is recorded only in technical papers by IT developers, while in few cases such knowledge is recorded electronically in metadata repositories for documentation and management purposes.

Organizations typically hire highly-skilled IT developers to provide customized services (following the SOA concept). Developers use available documentation on the data for developing such services. If available, data documentation includes location, format, relational parameters, quality, and priorities of the data. Such services are typically software programs, sensitive to technology changes and to client needs (e.g. required static schema content and format, and security). Such software programs typically map static data schema and orchestrations, and access specific IT sources. The drawbacks of such software implementations include the following:

(1) Scattered knowledge—knowledge of services and software components scattered among different systems and by multiple developers.
(2) Limited solutions—solutions depend on human decisions, lacking the full view of the available IT information and clients' future uses.
(3) Poor code reuse—huge amount of services and software components are not fully reused in many cases.
(4) Inflexibility—static services requiring a lot of maintenance and change management handling.
(5) IT-dependent solutions—changes in the IT layer typically require redeployment and new application programming interface (API) for the client;
(6) Ineffective product deployment—introducing services into market is time consuming and expensive (due to extended time to reach market).

In the prior art, there are many platforms that deal with some of the aspects mentioned above. A prior-art example by Morgenstern, U.S. Pat. No. 5,970,490 (hereinafter referred to as Morgenstern '490) hereby incorporated by reference as if fully set forth herein, teaches an integration platform for heterogeneous databases. However, Morgenstern '490 teaches a generic method for mapping data, focusing on databases. Morgenstern '490 does not teach methods for web-service integration or on-line integration. Furthermore, Morgenstern '490 does not teach methods for automated flow generation and execution based on priority rules, data quality, data availability, and other criteria A prior-art example by Amirisetty et al, U.S. Pat. No. 7,152,090 B2 (hereinafter referred to as Amirisetty '090) hereby incorporated by reference as if fully set forth herein, teaches a metadata-aware enterprise application integration framework for application server environments. However, Amirisetty '090 teaches tools for connectors and adapter generation, not on-line and dynamic integration (both important features in advancing the art of business integration methods). Amirisetty '090 primarily teaches java-platform tools in which users make high-level function calls. Metadata is used to describe the high-level and low-level function calls. The approach is not data-oriented integration.

A prior-art example by Michaelides, International Patent No. WO 2004/082179 A2 (hereinafter referred to as Michaelides '179) hereby incorporated by reference as if fully set forth herein, teaches a generic software adapter. However, Michaelides '179 teaches templates for software adapter and stream mapping using metadata, not data integration.

A prior-art example by Stanley et al., U.S. Pat. No. 6,988,109 B2 (hereinafter referred to as Stanley '109) hereby incorporated by reference as if fully set forth herein, teaches methods for an intelligent object-based information-technology platform. However, Stanley '109 primarily teaches data-mining tools, using direct mapping of objects to data for search purposes.

A prior-art example by Ainsbury et al., U.S. Pat. No. 6,078,924 (hereinafter referred to as Ainsbury '924) hereby incorporated by reference as if fully set forth herein, teaches methods for performing data collection, interpretation, and analysis in an information platform. According to the method of Ainsbury '924, data is replicated, not integrated, using a kind of "on-line cache" approach.

A prior-art example by Statchuk, US Patent Publication No. 2007/0055691 (hereinafter referred to as Statchuk '691) hereby incorporated by reference as if fully set forth herein, teaches a method for managing exemplar terms database for business-oriented metadata content. However, Statchuk '691 primarily teaches methods for reporting and searching metadata, not data integration.

A prior-art example by Ghatate, U.S. Pat. No. 6,317,749 B1 (hereinafter referred to as Ghatate '749) hereby incorporated by reference as if fully set forth herein, teaches methods for providing relationship objects. However, Ghatate '749 primarily teaches a relationship model, not an integration model.

A prior-art example by Walsh et al., U.S. Pat. No. 6,810,429 B1 (hereinafter referred to as Walsh '429) hereby incorporated by reference as if fully set forth herein, teaches an enterprise integration system. However, Walsh '429 primarily teaches tools for converting data to and from XML format, not data-integration tools.

A prior-art example by Brumme et al., U.S. Pat. No. 6,134,559 (hereinafter referred to as Brumme '559) hereby incorporated by reference as if fully set forth herein, teaches methods for integrating objects defined by different foreign object-type systems into a single system. Brumme '559 primarily teaches an "object-oriented integration" using tags for uniform objects that connect metadata objects to data within a data source. However, Brumme '559 does not teach methods for automated flow generation and execution based on priority rules, data quality, data availability, and other criteria.

Current approaches to business integration still present a difficult, time-consuming, and expensive process to an organization. The most urgent issues in the integration field needing to be addressed can be summarized as including:

(1) accessing heterogeneous data sources;
(2) making services "dynamic", as opposed to the current "static" aspect of services having fixed APIs and dependence on customized solutions, requiring full development and testing cycles for future API changes (i.e. poor flexibility);
(3) designating security at the "data level", as opposed to at the current "service level" (as in SOA), requiring changes in the services (or adding new services) in order to change the security of the data;
(4) making the services and the IT layer less interdependent, as opposed to the current situation in which the services and the IT layer are strongly coupled, requiring changes in the services (and new development and testing cycles) in order to replace or change the IT layer (e.g. changes in the legacy system require changes in the integration area and typically in the client application as well; new technologies like web services have made vast change in the authorization level; for example, previously when accessing databases directly, one could set access privileges at the "table-columns level"; whereas, using web-services technology, such a security level has vanished);
(5) improving data-rate quality to periodically and frequently provide up-to-date data;
(6) reducing required data transformations between the different services participating in the data-service-execution solution flow; freeing developers from having to understand the specific data types and formats from different heterogeneous data sources in order to write develop appropriate transformation routines;
(7) simplifying the mapping of data between different services participating in different solution flows (i.e. mapping between the outputs of one service to the inputs of the next service in the flow);
(8) reducing time to market due to tedious and costly development and testing cycles associated with publishing services/products;
(9) streamlining the deployment process by: add new modules declaratively, modifying mappings without new software development and testing cycles and without requiring shutting down the server in order to replace the old services with the new modified services, and managing service versioning;
(10) simplifying data synchronization by freeing developers from having to continually be aware of the different data sources and services handling the same data items;
(11) automating business processes integration to overcome weaknesses in static integration tools that provide developers static APIs for integration, requiring a full development team to be involved in integration development;
(12) automating "failovers" that are currently handled by developers (by redirecting requests to alternative available services) due to failover behavior being statically defined (i.e. hard-coded) in customized services, reflecting the inflexibility of the failover algorithm (i.e. modifying failover behavior in any service requires a new development cycle);
(13) automating service auditing that is currently handled by developers in a customized and manual fashion (i.e. any required auditing modification requires a new development cycle); and
(14) automating service monitoring that is currently handled by developers in a customized and manual fashion (i.e. any required monitoring modification requires a new development cycle).

It would be desirable to have systems and methods for automatic data integration among multiple heterogeneous data sources that treat the issues described above.

SUMMARY OF THE INVENTION

It is the purpose of the present invention to provide systems and methods for automatic data integration between among heterogeneous data sources.

For the purpose of clarity, several terms which follow are specifically defined for use herein. The term "integration" is used herein to include on-line execution (e.g. "data fetch") from multiple data sources without consideration of the technologies of the data sources (also referred to as a "virtualization" method). In such an integration scheme, on-line data synchronization of all data sources is included where the integrated data assets reside. The term "execution" is used herein to refer to accessing, retrieving, and/or updating data. The term "incomplete-request elements" is used herein to refer to portions of an internal request that did not receive a response from a data source. The term "incomplete-request fault" is used herein to refer to faults caused by the occurrence of incomplete-request elements.

The terms "metadata object" and "MDO" are used herein to refer to a basic logical entity used by an integration engine to define an object which represents a business data. The terms "metadata field" and "MDF" are used herein to refer to a low-level technical-data description residing in the data source. The terms "metadata component" and "MDC" are used herein to refer to a physical service, of a data source, that is used by the engine to access data source assists. The terms "compound metadata object" and "CMDO" are used herein to refer to an MDO that is constructed of "offspring" MDOs. The terms "dynamic service schema" and "DSS" are used herein to refer to a presentation of service based on metadata. The DSS can come in XML format, for example, including MDOs, for inputs and outputs, and other static user tags and predefined hints, to be used during resolving and executing operations.

Essential aspects of the present invention include automating the integration process, and centralizing the "user view" on a business-process level. In contrast, prior-art EII systems and methods focus the user on the technical details of the data sources and/or implementation technology.

Embodiments of the present invention utilize a Metadata-Oriented Architecture (MDOA) for automating the EII process, replacing integration by developers with a smart engine based on metadata. In the MDOA framework, clients provide a Smart Integration Engine (SIE) with a DSS. The SIE is then able to automatically build the best flow of physical services for the request execution (according to the metadata schema), executing the services flow against the relevant data sources, and aggregating back the required schema result.

The DSS is a request containing a given input and a required output, represented by XML metadata objects schema. The DSS is produced by programmers using a Dynamic-Service Builder Application (DSBA) as described in greater detail below. A dynamic service means that the service is being built dynamically at runtime by the SIE according to the metadata. The term "dynamic service" is used herein to refer to a service that is built dynamically in "runtime" by the SIE according to the metadata.

The MDOA approach leverages the use of metadata in the information integration field, enabling the metadata to be used for information documentation and information management, as well as to data/processes on-line flow execution.

A Smart Integration Server (SIS) fully supports ontology and virtualization through a Metadata Repository (MDR), mapping the physical system services, and data fields into logical components and data fields, offering appropriate high-level structures and mechanisms for representing the semantics of the heterogeneous data, and providing total separation to the user from the IT. The STS is an application server, acting as a middle tier, in the form of executable software and/or embedded firmware.

FIG. 1 is a simplified high-level schematic block diagram of the MDOA scheme, according to preferred embodiments of the present invention. A client 60 and data sources 80 are operationally connected to an SIE 10 having an MDR 40 (also referred to as an ontology repository in the art) used for IT documentation and management, and acts as an "IT aligner".

The SIS supports the DSS, providing full flexibility for future changes. Changes in the required service are performed declaratively by changing the output schema, at the business level, and without any need for additional development. These dynamic services are provided to the SIS as a metadata XML schema, built and executed at runtime, eliminating the need to maintain development of static services.

The SIS applies authorization to the metadata, supporting security on any level (data or service level), and providing authorized data automatically without any development efforts. Virtualization in the SIS totally isolates the system from the IT, making the replacing or updating of the IT layer fully transparent to the business services.

The SIS provides high data-rate quality by providing the freshest, and the most relevant, data by assigning priorities to the different services and data sources. Data transformations are defined by a team designer (described in greater detail below), and are applied automatically at runtime by the SS rate. Mapping data between the different physical services participating in the different solution flows is performed only once when declaring the metadata. At runtime, metadata is mapped by simple matching between MDOs to lead the flow.

In most MDOA implementations (if there are enough physical services to build a solution flow), service development is not necessary, requiring only declaratively defining the requisite XML schema based on metadata. There is no need to manage versioning, changes in solutions flows are applied automatically and transparently once a new service is hosted in the metadata repository, or changes are done on the current metadata mappings. MDOA provides automatic data synchronization in which the same data in different sources is updated automatically across all the data sources in the organization using the metadata mapping.

MDOA provides on-line and Automatic Business Processes (ABP) integration, binding business rules and business actions to the related metadata. The current business-process integration tools can continue to be used for executing asynchronous flows and long-transaction business processes.

MDOA provides seamless fail recovery, automatically finding/using alternative data-service-execution solution flows. The SIE searches automatically for alternative services to use in case of service execution failure. Service execution failure can occur in cases of service-execution exception in which the service is assigned as unavailable, a long latency, or any other failure criteria defined by the user. Services are assigned as unavailable by background sensors sampling the different services continuously.

MDOA provides fully-automated data and business-process auditing in which auditing is defined on the metadata level. The access type is recorded in the auditing system for each data access according to the auditing definitions in the MDR.

MDOA provides fully-automated monitoring of data availability, service usage, service performance, service latency, and service availability in which monitoring is defined on the metadata level. Monitored metrics are used for tracking the system, and for feeding back the system with information about service status (e.g. service availability, service failure, or service latency). As mentioned above, the service status can influence solution flows by suggesting alternative paths.

MDOA provides the enterprise system with a "plug-and-play"-type scheme. New physical services added to the system are connected automatically, and can be part of the next automatic solution flow, chosen by the SIS. At a specific point in the organization lifetime, the logical-components pool will be fully loaded, significantly reducing the need for development of new physical components.

MDOA enables users to "program at the business level" by allowing services to be built on a high business level (i.e. metadata level). MDOA and SOA complement each other. SOA is essentially a collection of services nodes for communicating with each other. Each SOA node can be implemented by the MDOA, providing a complete SOA solution in the integration field.

In the MDOA approach, the main roles defined include a team designer, a legacy developer, and a programmer. The team designer uses the Smart Integration Designer Application (SIDA) for managing the MDR. The legacy developer develops physical system services that are mapped to components added to the components pool (i.e. MDCs pool) by the team designer. These components are not defined for specific applications or specific logic; they are general, and can be fully reutilized. In time, the components pool becomes fully loaded, eliminating the need for developers to make new developments. The MDOA schema assumes that at a specific point in the organization lifetime (depending on the percentage of MDOA assimilation) the development role will be at least significantly reduced, if not eliminated, saving most of the development budget.

The programmer programs at the business level using the DSBA for building the DSS requests. The programmer builds the dynamic services, and embeds the services in the applications the programmer is developing. "Helper" applications are provided for the designer and the programmer. The helper applications are user interface (UI) applications communicating with the SIE that help manage the system information and define the required dynamic services.

The SIE is the "heart" of the MDOA and its implementation, transforming MDOA into real-world practicality and production use. The main task of the SIE is building and executing dynamic runtime services by using the legacy services (i.e. physical services) of the IT. The SIE receives a DSS request, builds the required component flow for executing the request, executes the flow by communicating with the relevant data sources, aggregates the results, and returns the results as a service-call result.

FIG. 2 is a simplified high-level schematic block diagram of an SIE deployment topology, according to preferred embodiments of the present invention. In FIG. 2, an SIS 11 is the kernel for SIE 10 (shown in FIG. 1). SIS 11 controls the organization network and access to data sources 80 (indicated in FIG. 2 by several various forms, e.g. fax, satellite, web services, databases, other sites via firewalls, etc.). Existing client applications 62 and new applications 64 in the organization use SIS 11 to access/update any data asset in a seamless mode, without any consideration where the assets are located, or what is the technology to use for getting the requested data. Furthermore, an organization portal 84 can be directed to provide dynamic data-fetching of all available data sources via SIS 11. SIDA 86 and DSBA 88 are also shown operationally connected to SIS 11.

SIS 11 uses a distributed number of smart integration agents (SIA 12) to communicate to various data sources 80 with the organization. Each SIA 12 is responsible for communicating to one or more data sources 80, which the organization groups according to data-source type, hardware profile, or other desired criteria. SIS 11 supports multi-site architecture, meaning that when SIS 11 is configured in such a multi-site deployment, SIS 11 is exposed to the site metadata and data sources of an SIS 11', allowing communication for retrieving data originally accessible only from SIS 11'. Each SIA 12 is installed at a sub-net level (i.e. LAN or domain) where data sources 80 are located, typically in a "server farm".

Data discovery is performed by automatic recognition of the data-asset definitions (metadata) of a specific data source. Service solution advising is performed by sampling the related physical system services (according to the dynamic service input and required output), and returning a set of flows representing solution paths for the requested DSS. The best solution is chosen according to priorities, data quality, rules, validations, historical statistics on the availability and performance of the different system components, and according to appropriate data-source optimizing processes.

Service solution execution is performed by running a solution flow against the relevant data sources for updating data, for retrieving required output schema, or for executing a required business process. The execution process supports a two-phase commit operation (i.e. data update), and service fault recovery.

Metadata-level security, metadata-level auditing and metadata-level monitoring are provided by a built-in security manager, auditing manager, and monitoring manager, respectively, applied on the metadata level as well as the service level.

FIG. 3A is a simplified schematic block diagram of the SIE high-level architecture, according to preferred embodiments of the present invention. Client applications 62 send DSS requests A to an advise/execute kernel 90 of SIS 11 (via Http or JMS, for example). SIS 11 processes DSS requests A using predefined metadata in MDR 40, and connects to the security of the organization's LDAP server (Lightweight Directory Access Protocol server) or other user-management system. SIS 11 finds the relevant SIA 12 that "masters" the relevant data source, builds an internal request B (in binary format), and sends internal request B to SIA 12 for fetching or updating the data. SIA 12 uses a worker's manager 13 and a smart integration worker (SIW 14 having an adapter 14') to execute the solution of internal request B on attached data sources 1-5 using a data-source communication protocol P1-P5 or an API.

SIDA 86 is a UI application for communicating with SIE 10, serving the team designer in managing MDR 40. IT alignment is performed by SIDA 86 (in conjunction with OR 82) by mapping physical IT services and data sources to logical entities (i.e. MDCs) in MDR 40. SIDA 86 also assigns security privileges to the different roles on the metadata entities. SIDA 86 also defines the appropriate rules, attributes, security, priorities, actions, validation rules, monitoring, auditing, and actions on the metadata.

DSBA 88 is a UI application for communicating with SIE 10, serving the IT service builder and applications programmer in building the required DSS, publishing the DSS as an XML file, service alias, or a classic web-service, and later using the DSS at runtime by embedding the DSS in related applications.

FIG. 3B is a simplified schematic block diagram of the SIA high-level architecture showing the internal modules, according to preferred embodiments of the present invention. Sensors 15 are used to monitor data sources 1 and 2 (via communication with data-source physical services 92) in order to determine data availability.

Therefore, according to the present invention, there is provided for the first time a method for automatically generating data-service-execution solution flows for executing data services from heterogeneous data sources using metadata objects, the method including the steps of: (a) providing a smart integration engine, having at least one smart integration server with a solution resolver residing therein, configured to receive DSS requests for executing the data services from the heterogeneous data sources, wherein the solution resolver has access to data assets stored in a metadata repository; and (b) generating the solution flows of the DSS requests based on metadata criteria and on the data assets.

Preferably, the method further includes the step of: (c) optimizing the solution flows based on client-defined criteria, on the metadata criteria, and on the data assets.

Preferably, the method further includes the step of: (c) aggregating common data-source requests into a request bundle to be sent for execution from a specific data source.

Preferably, the method further includes the step of: (c) sending an internal request, based on the solution flows, to smart integration agents for executing data from the data sources.

More preferably, the method further includes the step of: (d) discovering new data sources using the agents; and (e) modifying the solution flows based on the new data sources.

More preferably, the agents include sensors for monitoring status information from the data sources.

More preferably, the status information includes at least one item selected from the group consisting of: a data-source availability, a data-source validity, and an execution performance.

Most preferably, the method further includes the step of: (d) modifying the solution flows based on the status information.

More preferably, the agents include smart integration workers for operationally connecting to the data sources.

Most preferably, the workers include adapters for facilitating connection to the data sources.

Preferably, the method further includes the step of: (c) recovering from incomplete-request faults, upon the incomplete-request faults occurring, by redirecting incomplete-request elements of the incomplete-request faults to alternate data sources for execution.

Preferably, the method further includes the step of: (c) storing the DSS requests and user-defined requests and previously executed requests in a schema store for faster execution via alias calls and/or web services.

Preferably, the method further includes the steps of: (c) before generating the solution flows, verifying the DSS requests are allowed to be executed by a client application; and (d) upon failing to obtain verification, ignoring the DSS requests in the step of generating the solution flows.

Preferably, the method further includes the step of: (c) monitoring the DSS requests to obtain execution information.

Most preferably, the method further includes the step of: (d) using the execution information in order to generate new solution flows.

Most preferably, the execution information includes at least one item selected from the group consisting of: an execution time, an execution duration, and an execution status.

Most preferably, the method further includes the step of: (d) auditing the execution information for use in obtaining a history rollback and/or to search the execution information.

Preferably, the method further includes the step of: (c) triggering an operation upon execution of a designated request.

Preferably, the method further includes the step of: (c) automatically updating the data sources upon updating the data assets.

Preferably, the method further includes the step of: (c) modeling execution of the data services using the solution flows.

Preferably, the method further includes the step of: (c) aggregating returned data values from all the data sources into a single DSS response according to an output format.

Preferably, the metadata criteria include at least one criterion selected from the group consisting of: a priority rule, a data-source availability, a data quality, a number of request steps, a data-source validity, and an execution performance.

Preferably, the metadata repository includes technical metadata and business metadata, wherein the technical metadata provide data-source information for executing the DSS requests, and wherein the business metadata represent the technical metadata in client terms.

Most preferably, the technical metadata and business metadata include metadata selected from the group consisting of: metadata objects, metadata components, metadata fields, compound metadata objects, organizational information, site information, data-source information, MDO-MDF association information, MDO-MDO association information, MDF-MDF association information, association transformation information, security, permission privilege information, policy information, validation information, and data-schema alias information.

According to the present invention, there is provided for the first time a system for automatically generating data-service-execution solution flows for executing data services from heterogeneous data sources using metadata objects, the system including: (a) a smart integration engine for executing the solution flows; (b) at least one smart integration server for receiving at least one DSS request for executing the data services from the heterogeneous data sources; (c) a metadata repository having at least one data asset that serves as an input for the solution flows; and (d) a solution resolver for generating the solution flows of at least one DSS request based on metadata criteria and at least one data asset.

According to the present invention, there is provided for the first time a computer-readable storage medium having computer-readable code embodied on the computer-readable storage medium, the computer-readable code including: (a) SIE program code for enabling a smart integration engine to execute a solution flow using metadata objects; (b) SI program code for enabling a smart integration server to receive at least one DSS request for executing data services from heterogeneous data sources; (c) MDR program code for enabling a metadata repository to have at least one data asset that serves as an input for the solution flow; and (d) SR program code for enabling a solution resolver to generate the solution flow of at least one DSS request based on metadata criteria and at least one data asset.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to systems and methods for automatic data integration among multiple heterogeneous data sources. The principles and operation for automatic data integration among multiple heterogeneous data sources, according to the present invention, may be better understood with reference to the accompanying description and the drawings.

Figure 1:
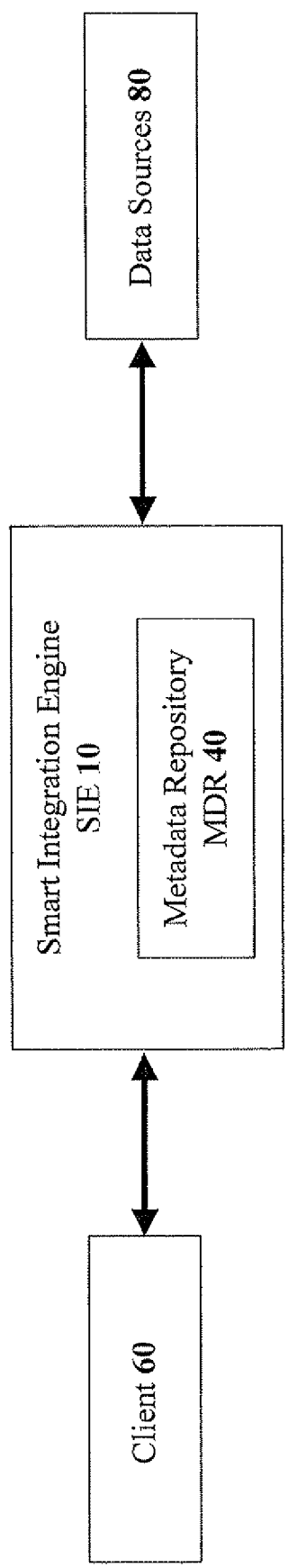
FIG. 1 is a simplified high-level schematic block diagram of the MDOA scheme, according to preferred embodiments of the present invention.
Figure 2:
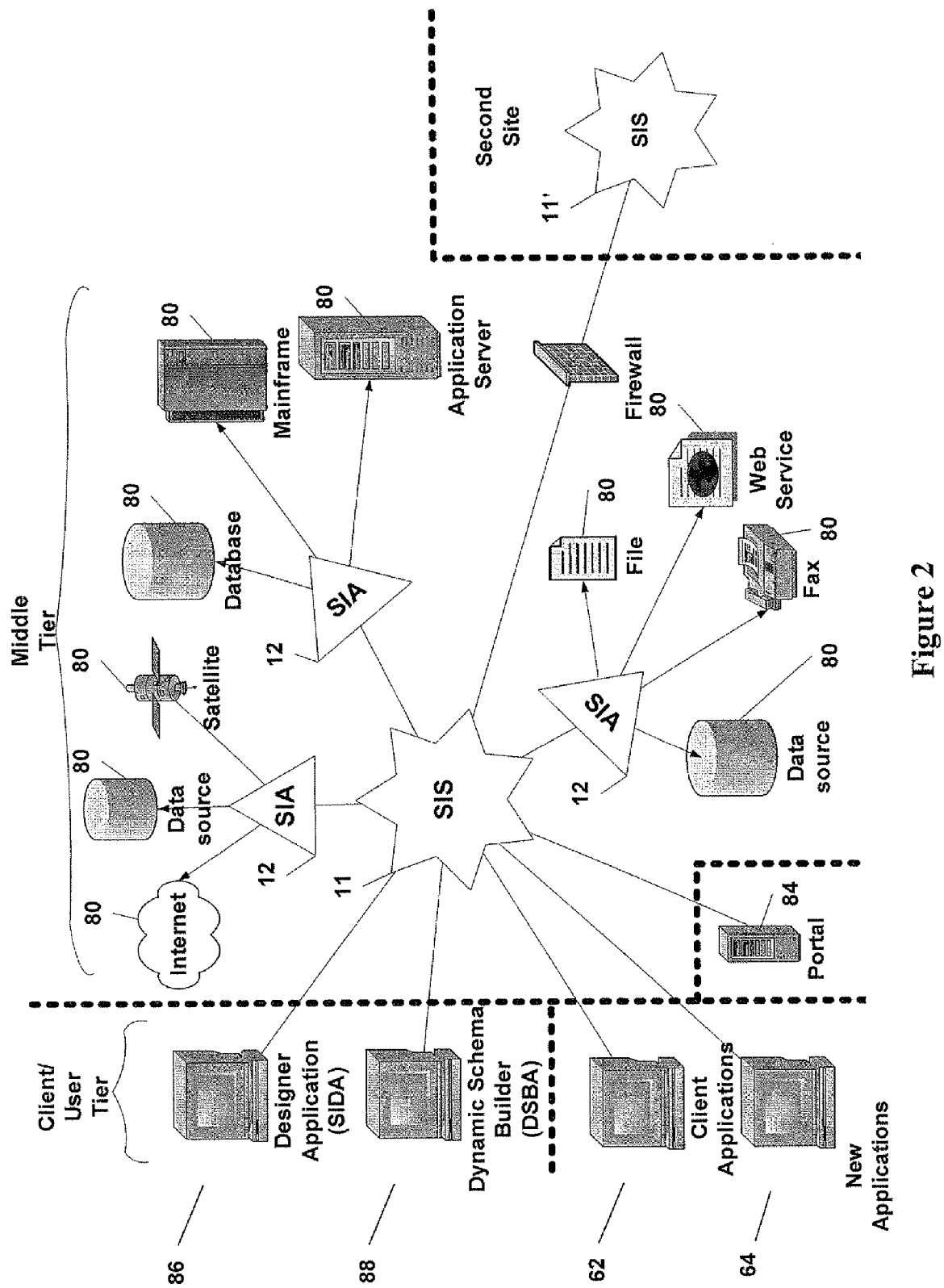
FIG. 2 is a simplified high-level schematic block diagram of an SIE deployment topology, according to preferred embodiments of the present invention.
Figure 3A:
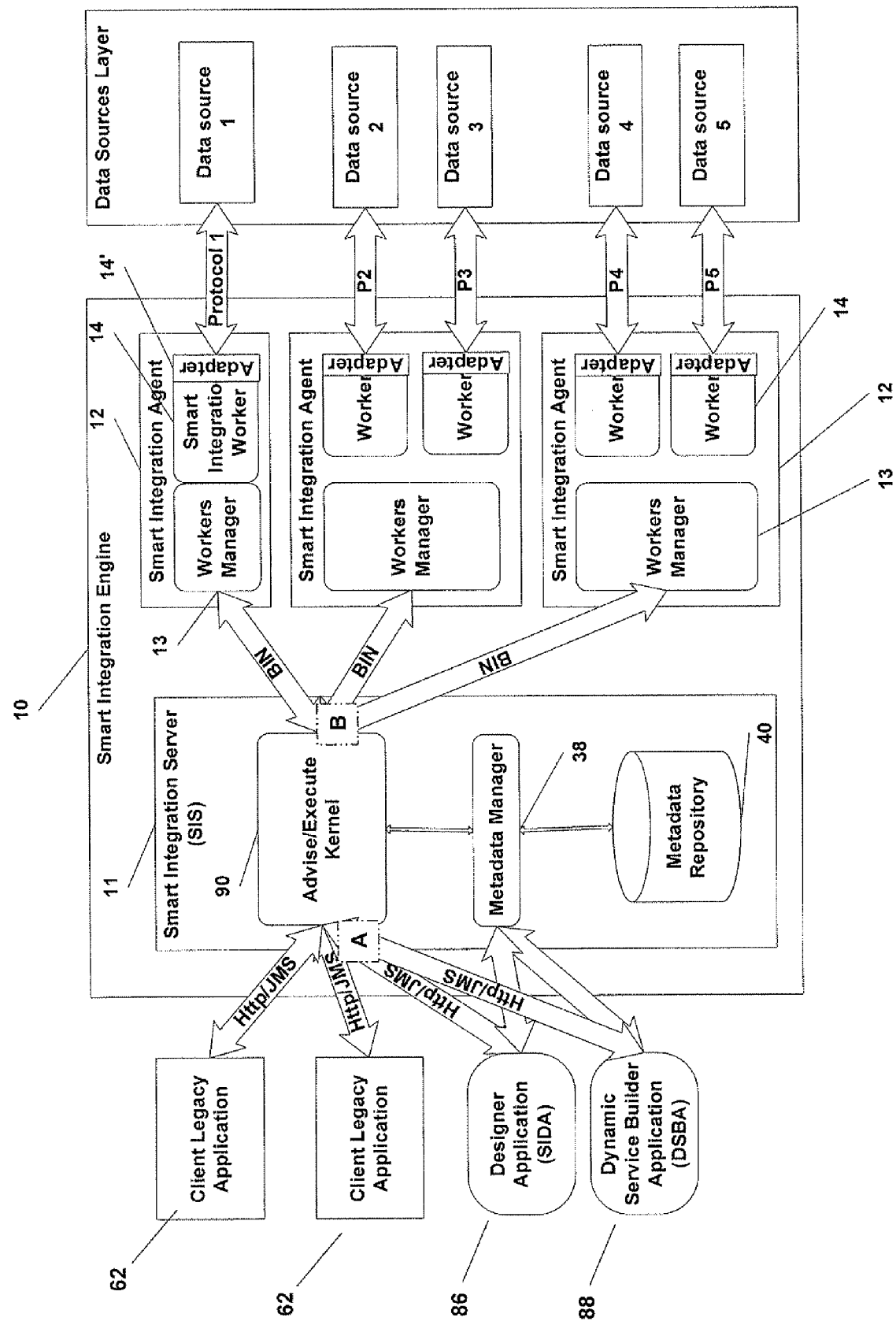
FIG. 3A is a simplified schematic block diagram of the SIE high-level architecture, according to preferred embodiments of the present invention.
Figure 4:
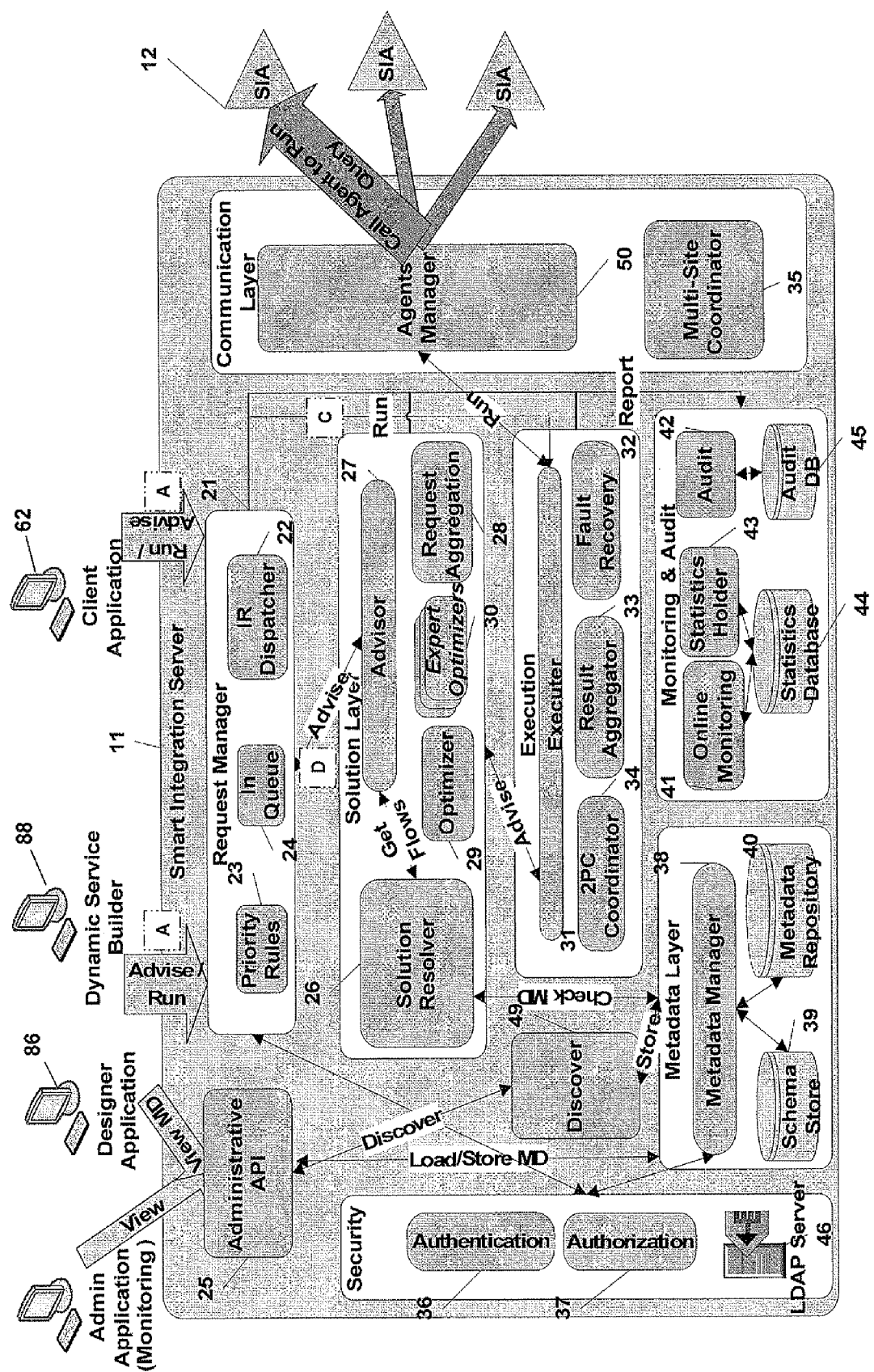
FIG. 4 is a simplified schematic block diagram of the internal components of the SIS, according to preferred embodiments of the present invention.

Referring now to the drawings, FIG. 4 is a simplified schematic block diagram of the internal components of the SIS, according to preferred embodiments of the present invention. A request manager (RM 21) is the first tier of SIE 10, and is responsible for queuing DSS requests A of FIG. 3A (i.e. the client service calls). RM 21 provides SIE 10 the ability to process the DSS inside requests A without any intervention or disruption asynchronously. RM 21 utilizes an asynchronous and a synchronous APT. Using the asynchronous API (in Http or JMS format, for example), client application 62 sends DSS request A without waiting to get the required data from SIE 10. SIE 10 handles the DS schema (described in greater detail below), and returns the data to a listener at the client side.

Using the synchronous API, the client uses a client-side layer that provides access to SIE 10 in a "blocked mode". The client-side layer performs the call to SIS 11, which returns with the required data, while client application 62 is blocked waiting for the DSS to complete. The synchronous API supports various client technologies (e.g. web-service (simple object access protocol (SOAP) over Http or JMS), Http listener, and standard proxy calls (e.g. COM/CORBA/Java RMI/.Net remoting)).

RM 21 authenticates client application 62 to obtain a valid session to perform the DSS via authentication module 36. Authentication module 36 runs on any LDAP server 46 the organization has, or on a local integration for the organizations' user management system. After getting approval, RM 21 queues the DSS in an in-queue module 24. If RM 21 does not receive approval, there is no valid session for client application 62. RM 21 then returns to client application 62 immediately with the relevant error code.

All messages are inserted to in-queue module 24 according to predefined priorities which are defined by the team designer. A priority-rules module 23 gives the organization the ability to execute internal business processes without being affected by the current DSS calls to be processed by the system (e.g. real-time reactive applications that should not be affected by low-priority processes on the system).

Once the DSS is inserted to in-queue module 24, an in-request dispatcher module 22 is activated to retrieve the DSS from in-queue module 24 for processing. In-request dispatcher module 22 is an independent thread that opens the DSS package for recognizing DSS type. The DSS comes in two types of requests. The first type of request is for fetching or updating data from data sources, and is called a run request C. The second type of request is for retrieving and viewing the execution path (i.e. solution) to be run for resolving the required DSS, and is called an advise request D. Run requests C are sent to an executer module 31, while advise requests D are sent to an advisor module 27.

For incorrectly formatted requests, client application 62 receives an "invalid syntax" error code. Once client application 62 is authenticated and the DSS request is validated, advisor module 27, executer module 31, and SIA 12 can start processing the request.

Priority-rules module 23 is constructed from a set of dynamic rules that are defined by the user (e.g. team designer or developer) via SIDA 86. Furthermore, the organization can customize priority-rules module 23 programmatically by writing custom "rule-plugs". Such plugs are software units that implement specific interfaces defined by SIE 10.

Authentication module 36 is managed via the user management layer and the integration layer to any LDAP server 46. These layers are responsible for obtaining a valid session for client application 62. SIS 11 uses the same authentication procedures (if there any) used by the organization, including Single-Sign-On (SSO) support. SIS 11 uses default authentication module 36 for customers who do not manage their users via a centralized system.

For customers using a non-LDAP system, a local integration between SIS 11 and the local system is supported. This layer also handles opened-session caches. When a specific user in a specific client application 62 is identified by SIS 11, the session is cached as an opened session for the entire application lifetime. At this level, SIS 11 also caches the addresses of the SIA 12 used for the particular session for later performance enhancement.

When SIE 10 uses secured physical components (i.e. components that require username and password), authentication module 36 is responsible for managing the sessions by using the service properties stored in MDCs.

An authorization module 37 manages a permission process through the security layer. Authorization module 37 serves two purposes. First, authorization module 37 integrates SIE 10 with existing privilege systems. Second, authorization module 37 adds privilege extensions to new metadata objects that are added by SIE 10 and the team designer. Bach MDO has a permission entry that defines the allowed/denied access users. This information is kept in MDR 40, and correlated with LDAP servers 46. Authorization module 37 obtains the relevant permissions of any MDO accessing MDR 40 and LDAP server 46 at the same time.

A metadata manager (MDM 38) manages the metadata of the system. The metadata layer serves as the system metadata cache, and is loaded during launch of SIE 10. SIDA 86 operates on the metadata layer using an administrative API 25, and is the viewer and editor of all metadata-layer content.

Metadata is divided into two parts, technical metadata and business metadata. Technical metadata includes:
(1) data sources in the organization used by and/or connected to SIE 10;
(2) information needed to connect to data sources (e.g. IP address, technology, and the connection method);
(3) physical services of a specific data source and the technology of the service;
(4) data asset definitions for specific data source (i.e. MDFs);
(5) sites of data sources and services;
(6) customized attributes for data sources defined by the customer; and
(7) privileges defined in data source assets.

Business metadata includes:
(1) associations that map all technical data to business terms;
   (a) data-asset mappings to other data assets and the translation and/or transformation functions between those entities;
(3) previous mappings that produce MDOs;
(4) data-source physical services mappings to MDCs; and
(5) mappings that produce CMDOs, constructed from other MDOs, that can be nested to several levels and can contain static tags/text (e.g. customer information as exemplified below).

```
<Customer_Info>
    <Customer_Name />
    <Customer_Address />
    <Phones>
        <Phone1 />
        <Phone2 />
    </Phones>
    <Orders>
        <Order_Info>
            <Order_ID />
        </Order_Info>
    </Orders>
</Customer_Info>
```

In the example above, Customer_Name, Customer_Address, Phone1, Phone2, and Order_ID are MDOs, and Customer_Info, Phones, and Orders are static tags.

Figure 5:
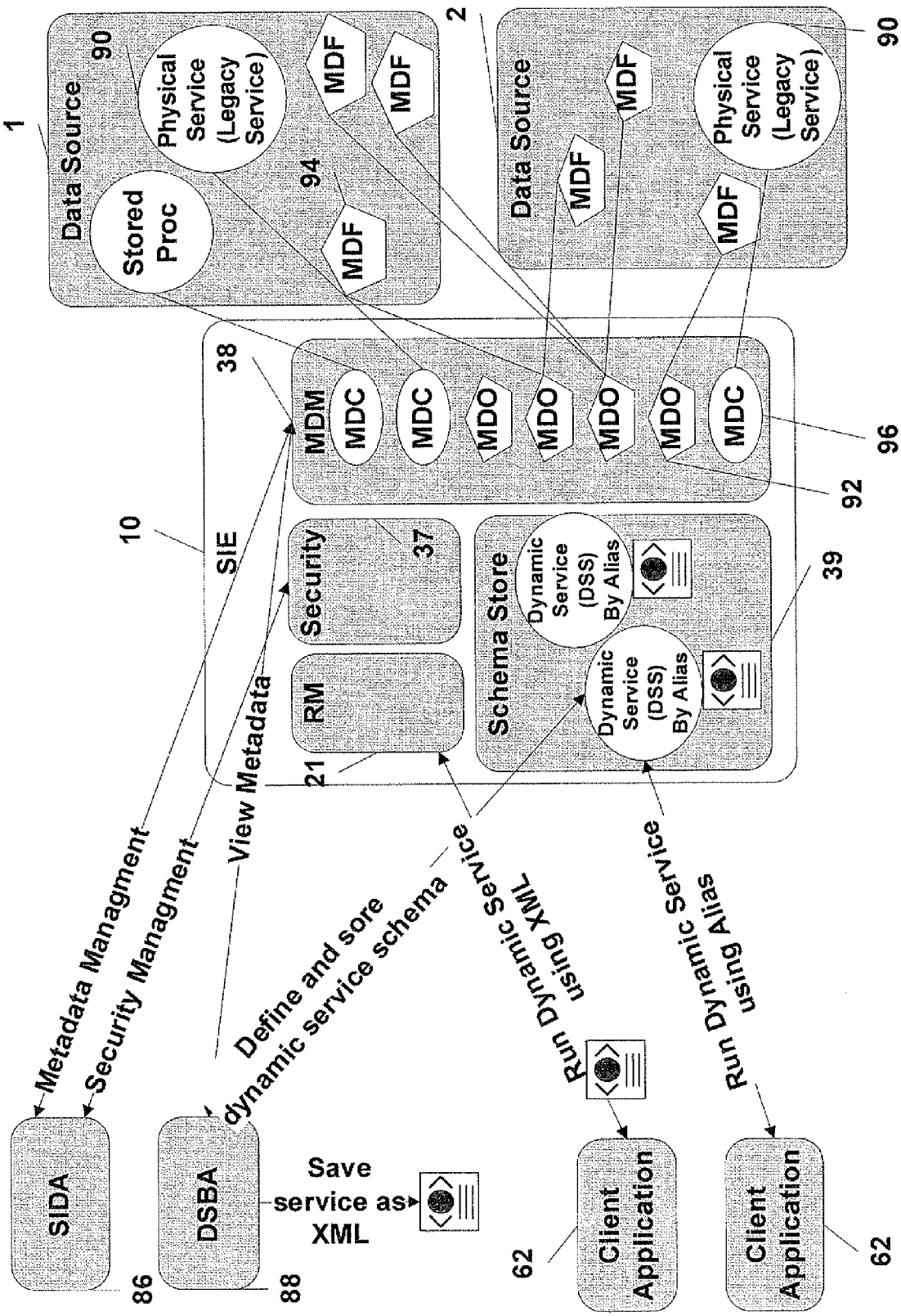
FIG. 5 is a simplified schematic block diagram of the different internal entities of the SIE and the inputs and outputs of the different SIE applications, according to preferred embodiments of the present invention.

FIG. 5 is a simplified schematic block diagram of the different internal entities of the SIE and the inputs and outputs of the different SIE applications, according to preferred embodiments of the present invention. The first steps for building the metadata are connecting to data sources 1 and 2 and physical services 90, defining MDOs 92 and MDFs 94, and setting the association between MDOs 92 and MDFs 94, as shown in FIG. 5. The next step for the team designer is to complete the metadata attributes by adding essential information to MDOs 92 and MDFs 94. This essential information defines the SIE behavior while handling and executing data requests. Such attributes include:

(1) simple identification attributes:
   (a) ID unique internal identification number;
   (b) name—internal unique name;
   (c) display name—non-unique name for display;
(2) data type;
(3) visibility: MDO/MDF can be defined in the system for internal use (e.g. the team designer can define MDO/MDF for evaluation and not for execution, meaning that the user or developer could use such an object for testing flows off-line, but not for runtime execution);
(4) access permissions: the administrator uses this attribute to define which users are allowed to use a given MDO/MDF via predefined (by team designer) roles-users relations (In most cases, the MDF is extracted from the data source (by the data discovery process), but can be configured to override this step);
(5) read/write privilege: defining the object type (Some objects are defined for read-only, which is the default for any new MDO/MDF in the system, and others are marked as updateable (i.e. writeable); the MDF access property can be extracted from the data source or overridden in this case as well. In the MDC context, MDOs can be defined as read-only, write-only, or read/write (the access attribute refers to the physical field in the physical service). The same MDO can be defined as read-only in one MDC 96, and as write-only in another MDC 96); and
(6) uniqueness: defines if the object is unique or not.
   MDOs have the following additional attributes:
(7) constraints and validation rules: set of rules for validating the in/out values for each MDO;
(8) components:
   (a) list of components (MDCs) for which given MDO acts as input;
   (b) list of components for which given MDO is produced as output;
(9) physical fields: list of physical fields (MDFs) for which given MDO is associated with;
(10) offspring MDOs: applies to a CMDO; and
(11) site: source which masters (i.e. defines) given metadata.
   MDFs have the following alternate attributes:
(7) priority/weight: when there are multiple MDFs associated with one MDO, priority/weight is used to determine which MDF to choose (The SIE defines the rules mechanism upon this property; for example, the priority changes from site to site for the same object, the customer can define to bring the data from a specific site.); and
(8) bidirectional transformation or casting: necessary when there is a need for static transformation between two MDFs associated with the same MDO or between two MDOs (In most cases, transformations are performed automatically through flow generation).

The objects attributes are extendable, so that the organization has the ability to add more attributes to the objects. The administrator/designer can add primitive data-type attributes, or can use simple calculation formulas from SIE 10 to define a new attribute. For example, the team designer can define a new string attribute "myContact" for storing the contact person's name and to get information from the object, or the team designer can add new attribute "percent_val" to hold the calculated percentage of one attribute from another.

Furthermore, the customer can write custom software to make attributes affect the decision of the solution resolution and execution processes. In building custom queries as described above, the access attribute can be determined automatically, which is not the case when metadata is being discovered for stored procedures and functions hosted in the databases. For the team designer to set access attributes for an MDO, information about the physical services is needed, and whether input fields are used for read, write or for both.

MDR 40 is a database that holds all the relevant information for all metadata, serving the internal mechanism of SIE 10, the team designer, and the programmer. All the described entities described in MDM 38 are mapped into MDR 40. MDR 40 is replicated and synchronized automatically for multi-site deployment of SIE 10, enabling each site to recognize and utilize the assets in other sites. The following data resides in MDR 40.

(1) Databases
   (a) Database connection information (e.g. location, IP address, security information, pooling, min/max connection settings, and encryption) is stored in the data-source tables in MDR 40.
   (b) Tables are discovered automatically (according to the database schema), and hosted in MDR 40 as queries; whereas, indexes are used as the "WHERE" clause within the query statement. An automatic statement such as "SELECT <FIELD LIST> FROM <TABLE>" is created for each index. Fields for each index are treated as input MDFs of the new MDC, and the returned result-set fields are the output MDFs of the MDC. Input and output MDFs are connected to MDOs.
   (c) Stored procedures and functions are discovered automatically and hosted in new MDCs; whereas, parameters for such procedures and functions are the actual input MDFs connected to MDOs, and the returned values or datasets are represented as output MDFs of the MDC.
   (d) The team designer has the ability to add new queries to the system. A special form within SIDA 86, which displays all tables, views, columns, indexes, and functions, helps the team designer to drag and drop these database objects to a specific area in the SIDA form. The team designer connects objects together in order to create inner/outer "joins". The "$" sign is used to define parameters in the "WHERE" clause, or in the "SET/VALUES" keyword, within the UPDATE or the INSERT command statements. The query statement is validated against the relevant database, and a new MDC is created in the system, and defined in MDR 40. As explained above, the parameters are used as input MDFs, and the returned result set is used as output MDFs. Both the input and output MDFs are connected to MDOs as well.
(2) Web-services
   (a) connection information (e.g. location (URL), security information, SSL, and pooling) is stored within the data-source tables in MDR 40.
   (b) Web methods are discovered according to the WSDL document of the web service. According to the schema, simple and compound (i.e. fields hierarchy) MDFs are created automatically and connected to MDOs. Each web method is represented as an MDC related to the web-service data source.

(3) COM/COM+
(a) Connection information (e.g. location (file name and directory), security information, and pooling) is stored within the data-source tables in MDR 40.
(b) Methods are discovered automatically through the COM/COM+ metadata. Each COM/COM+ file is represented as an individual data source, and each method is represented as an MDC. Input/output fields of a method are the MDFs connected to MDOs.

(4) J2EE
(a) Connection information (e.g. location (J2EE Server), security information, and pooling) is stored within the data-source tables in MDR 40.
(b) Methods are discovered automatically using reflection. Each EJB is represented as an individual data source, and each EJB method is represented as an MDC. Input/output fields of a method are MDFs connected to MDOs.

(5) .NET
(a) Connection information (e.g. location (assembly file), security information, and pooling), are stored within the data sources tables in MDR 40.
(b) Methods are discovered from the .NET assemblies using reflection. Each object server is represented as an individual data source, and each method is represented as an MDC. Input/output fields of a method are MDFs connected to MDOs.

(6) SAP
(a) Connecting to an SAP system is done via RFC or web services. Connection information (e.g. location of the application server, security information, and pooling) is stored within the data-source tables in MDR 40.
(b) Each SAP system is represented as an individual data source, and each method within an individual RFC is represented as an MDC. Input/output fields for each function are the MDFs connected to MDOs.

(7) SIEBEL
(a) Connecting to a SEIBEL system is done via Siebel business modules. Connection information (e.g. location of the application server, security information, and pooling) is stored within the data-source tables in MDR 40.
(b) Each SIEBEL system is represented as an individual data source, and each method within an individual business module is represented as an MDC. Input/output fields of a method are the MDFs connected to MDOs.

(8) Custom Adapters
(a) SIE 10 provides a software development kit (SDK) for developing adapters for non-standard technologies. Such adapters 14' are implemented as an extension of drivers of SIW 14, meaning that a custom adapter 14' implements a defined driver API. Integration programmers and legacy team members in the organization can use such an SDK to develop new adapters. For example, adding an application server (i.e. data source) that accepts TCP/UDP requests to SIE 10 requires developing a custom adapter for accessing the server sockets, and for transforming the application-server proprietary format to the SIE format. Notice that for non-standard technologies/data formats, there is a need to define mapping between these formats and the SIE format for each new dynamic service, unless a standard mapping is applied within the new adapter.

As shown in FIGS. 4 and 5, a schema store 39 is a repository for holding predefined DSS defined by the developer or the user, and identified by aliases. The developer can define an output schema and a list of inputs (without values), and identify the schema by an alias. The programmer, or a client application 62 as shown in FIG. 5, can use the DSS request by using the alias without reconstructing the output schema, and giving the input MDO values to be used during the request. The system helps the user to apply the needed values for all the predefined inputs. Such a configuration helps the organization to define in advance, and debug, tune, and store the important and critical queries in the system for later production use.

Once a DSS is defined and stored, the team designer can publish the DSS as a new MDC 96 for other dynamic services to use. The new MDC 96 is presented as one entity for the programmers, simplifying the displayed flows. Furthermore, an IT department can publish such DSS as web services. For such purposes, schema store 39 helps the team designer by providing management capabilities in the form of a list of all published web services. The team designer can add more description to such services (e.g. creation date, location, and reason). The web-service publisher automatically generates the relevant WSDL (using the metadata), representing the DSS as a static web service. The team designer can return to the stored web service in SIE 10 and modify the web service, but once the schema is changed, the system automatically generates a new web service.

Schema store 39 holds some of the resolved paths which have been found in the design phase for performance reasons (i.e. the team designer can advise the system to get the possible paths for a specific DSS, and can choose to save/store a specific path or part of the path, so that this path will be already resolved at runtime, reducing time spent to find the solution flow). This mechanism is invalidated when the metadata is changed in MDM 38, meaning that when the metadata (technical or business) is changed, then the query can have a different solution, so the team designer and the administrator need to receive a notification about the stored flows in the system, giving them a chance to re-advise in order to obtain a better solution than the one stored. For a stable running system (with no metadata changes), the system caches all the resolved DSS for the server session in schema store 39.

Advisor module 27 is where every DSS should go through. The main functionality of SIS 11 is to find the optimal solution (i.e. a path of potential component execution) for a DSS, or just simply getting specific required outputs from a set of inputs and performing some actions (e.g. send email or write to a log) during the execute path.

When advisor module 27 receives the DSS (in the form of advise request D of FIG. 4) from RM 21, advisor module 27 checks for security and privileges, predefined by the designer/administrator in MDM 38 and MDR 40, to see if the user (or client application 62) is authorized for such data access/update and MDC/DSS use. When "not approved" is returned, a relevant message is sent to client application 62. When "approved" is returned, advisor module 27 passes advise request D to a solution resolver (SR 26 shown in FIG. 4) to get all possible flows (i.e. solutions) for the DSS. The flows are sorted by relevance (e.g. optimal or reliable).

Advisor module 27 then passes all solutions received from SR 26 to an optimizer 29 for finding ways to optimize the solutions according to the target data sources. During the optimization mode, expert optimizers 30 are used to make the solutions executable and to refine the solution according to the target system. Expert optimizers module 30 is a set of optimizers written specifically for each type of data source. For example, an SQL optimizer to optimize relational databases (inside such an optimizer there is an Oracle optimizer and a DB2 optimizer). SIE 10 is able to load any expert optimizer dynamically, meaning expert optimizers module 30 implements a predefined interface identifying the system it optimizes. SIE 10 then loads those extensions at runtime to be used during DSS executions.

During the optimization mode, SIE 10 makes groupings of data sources via a request aggregation 28. SIE 10 aggregates all calls from one data source to be sent to one SIA 12 within one package for execution (during a run request). The aggregation phase also includes optimization, meaning that when SIE 10 aggregates several steps of the same data source, SIE 10 consults optimizer 29 (and expert optimizers module 30) to see if the aggregated steps can be used as one "atomic" call to the data source. The best example of such an aggregation & optimization is the relational database join operation (i.e. if expert optimizers module 30 detects that several steps can be replaced by one join SQL statement, the query inside the node is changed to use the join statement; if not, then the aggregated node holds several separate SQLs).

For an advise request D, advisor module 27 returns all the optimized & sorted flows to DSBA 88 which displays these flows to the programmer as solutions found by the system for the request, and gives the programmer the ability to affect those flows by adding "hints", or even to change the request to get a better solution. Hints can be actions hooking into the flow (e.g. the user can add, as a new node in the flow, "out-of-the-box" conditional expressions to DSBA 88, or user-module extensions such as DLLs or scripts).

There are several ways for the team developer or user to influence the flow.
(1) User can decide to firmly fix a sub-graph of any flow, meaning that the user is choosing to activate a specific sub-flow or an entire flow in any circumstance.
(2) User can manually add more hints to a suggested flow to make the flow closer to the desired intention. Such hints can be defined by adding an additional component, and connecting the component to an existing flow.
(3) User can cancel a flow or sub-flow, giving the system an instruction not to go through such an execution path.
(4) User can add/change priority within the request, forcing SIE 10 to choose a more strict execution flow.

After such manual changes, the user can choose to advise again to see how SIE 10 "adjusted" the hints and manual changes. Or, the user can choose to use exactly the flow just edited (an entire "firmly-fixed" solution). Flows returned from advisor module 27 are represented as directed graphs, and split into steps that define the order of the execution, so different nodes in one step will be executed in parallel.

A node in a flow includes the following:
(1) the MDC to execute and its data source;
(2) input MDOs;
(3) output MDOs; and
(4) the query/call in the exact format to be used for a given data source.

Figure 6A:
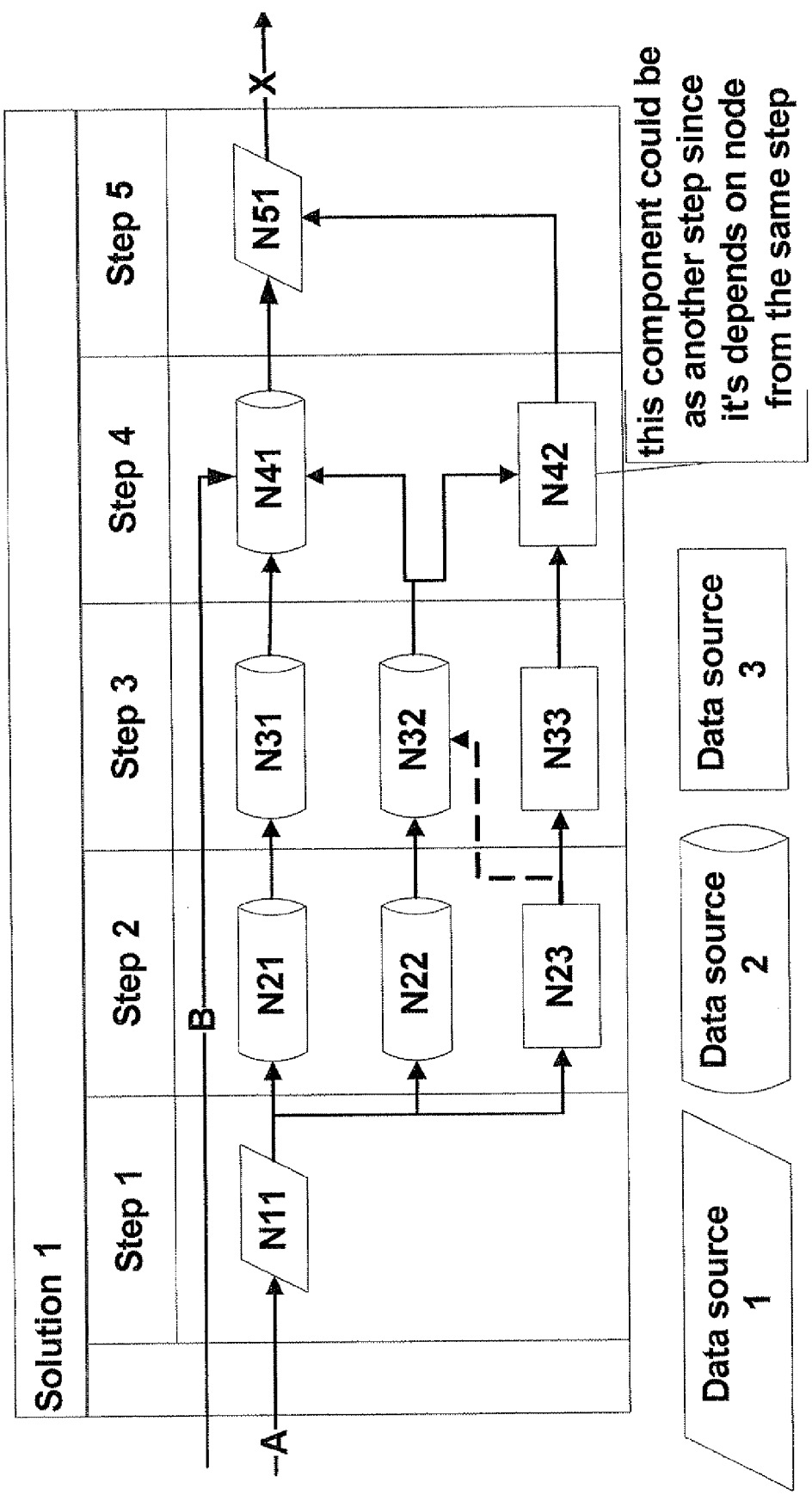
FIG. 6A is a simplified flowchart of an execution path of a user request involving several data sources and different services from those data sources, according to preferred embodiments of the present invention.

An exemplary scenario will serve to illustrate the flows and aggregation. Consider the following example. Given an organization architecture with 3 data sources in which the user queries X from A and B, SR 26 will produce the solution/flow shown in FIG. 6A (where N is a node). FIG. 6A is a simplified flowchart of an execution path of a user request involving several data sources and different services from those data sources, according to preferred embodiments of the present invention.

Figure 6B:
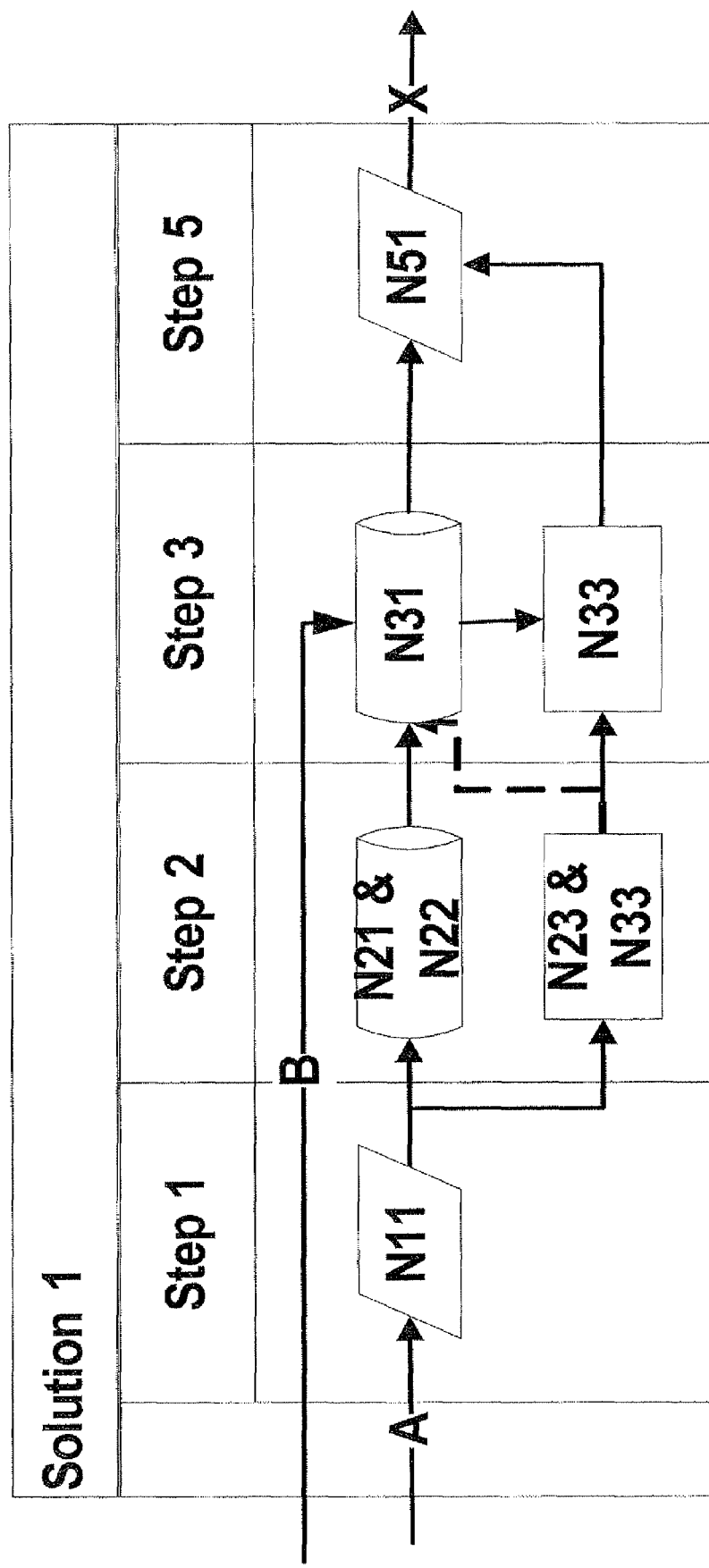
FIG. 6B is a simplified flowchart of a better optimization for the flow shown in FIG. 6A.

Applying an aggregate algorithm gives the graph shown in FIG. 6B. FIG. 6B is a simplified flowchart of a better optimization for the flow shown in FIG. 6A. Node N21&N22 will be executed in parallel with N23&N33. If the dashed arrow is eliminated, then N31 will be executed in parallel with N33. Nodes N21&N22 an N23&N33 in the optimized graph of FIG. 6B are sent to SIA 12 as one package (even if the nodes are different queries/calls) to optimize communication and reduce "chattiness" between the SIS 11 and SIA 12.

SR 26 gives all possible solutions for a DSS, retrieving any requested output using a given input and considering hints on inputs and outputs. SR 26 finds the paths between inputs and outputs of components declared in MDR 40 to build all possible solutions for the user request. A high-level concept backward-chaining pseudo-algorithm for searching such solutions is described as follows:
(1) step←0
(2) Find-Solutions (il: input list, ol: output list, s: solutions, step: int)
(3) For each output o in ol:
  (a) If (o is included in il), continue to next output
  (b) Let cl←(all components having o as an output)
  (c) Let os←nil
  (d) For each component c in cl:
    (i) Let cs←nil
    (ii) Let ci←(all C inputs)
    (iii) If (ci not fully contained in il)
      (A) step←step+1
      (B) Find-Solutions (il, ci, cs, step)
    (iv) Add c to cs (under current step)
    (v) Add cs to os
  (e) Merge os with s (by step)

The above algorithm is a partial algorithm, and is missing all privilege considerations and basic optimizations performed during the backward chaining. The algorithm just gives an exemplary overview of the real algorithm used for building and finding all solutions for a set of inputs and outputs. The backward-chaining search algorithm ignores paths which are not allowed for the specific user (e.g. when user is not allowed to use a specific component, the system utilizes another permitted component (if any exist)). The same for MDOs, if the user is not allowed to use specific data, then the data is not used in the solutions of the associated request. This is true in all cases except for CMDOs. When the user has access privilege to a CMDO but does not have such a privilege to access one of the offspring MDOs of the CMDO, then the CMDO access privilege is used.

Once all paths are found, SR 26 applies the optimization and ranking patterns to sort all the solutions, from best to worst (perhaps dropping part of the solutions not adhering to criteria defined by the user). The optimization mode means that the system can suggest a different set of calls to data sources to obtain better performance, knowing the data-source capabilities. The ranking phase means that each flow in the solutions list will get a rank, and all flows will be sorted at the end.

The "best solution" varies among customers, so the ranking formula needs to be customizable. Moreover, the programmer can define a ranking formula for personal requests (e.g. local definition) that differs from the general formula defined for the whole system. The following parameters are part of the rank formula:
(1) data master and data quality;
(2) number of systems in the flow;
(3) faster solutions (i.e. faster=shorter response time);
(4) number of used data sources (e.g. the fewer the better)

Executer module 31 is the module to execute/run the selected best solution for the required request. This module is provided with a flow/solution to run against the various data sources using the relevant SIA 12. Executer module 31 gets a flow from advisor module 27 (the flow is already optimized and holds the real queries/calls to execute on the data sources, so all that is left is to execute). Executer module 31 traverses the flow (in the "start to end" direction). For each node in the flow, executer module 31 gets the query/call to run, and recognizes the appropriate SIA 12 using an agents manager 50 (shown in FIG. 4) to be used for communicating with the data source (using the technical metadata). The call is wrapped into one package with the appropriate values of the MDOs, and sent to SIA 12. The flow is split into steps, so executer module 31 executes nodes in the same step in parallel, opening several agent calls at the same time.

After execution on SIA 12, the result is saved in a result aggregator module 33 that holds the values returned from the data sources in one global table. The values in such a table are used as inputs for building and running the solution, and used to reformat the returned result following the DSS.

Executer module 31 also handles updating requests. The update operations bring additional complexity to SIE 10 with regard to data consistency. For update operations, executer module 31 activates a two-phase-commit coordinator (2PC coordinator 34) that initiates a transaction on all relevant data sources (using SIA 12), and can commit or abort the transaction later to maintain data-source consistency.

During flow execution, failures can occur (e.g. the data source is down, or SIA 12 response is taking too long according to criteria defined by client application 62). When failures occur, executer module 31 finds alternative solutions for the problem. This means that executer module 31 uses the failure as a sub-problem, and takes the output which was requested in the failed operation, and uses advisor module 27 to find the output when all solved data stored in result aggregator module 33 is used as input. Advisor module 27 returns the new sub-flow for execution, and executer module 31 continues with the original flow. All the above functionality is performed by a fault-recovery module 32. This mechanism provides a seamless recovery for any system in the organization.

A discover module 49 is a SIDA service in SIE 10. Discover module 49 obtains information of the data source to be discovered from the team designer, and connects the SIA 12 responsible for the data source to fetch and discover the data assets on the data source. SIW 14 also includes part of the discover features, since SIW 14 is the one to connect and fetch assets from the data source.

Administrative API module 25 is the API level for direct access to SIE 10. Administrative API module 25 gives the applications (SIDA 86, DSBA 88, and others) a brief access to MDM 38 and MDR 40, also to all monitoring and auditing features. Furthermore, discover requests go through this administrative API module 25. This is in contrast to RM 21, since administrative API 25 bypasses priority-rules module 23.

Agents manager 50 manages all the communication to the agents layer. This module masks all SIAs in SIE 10 to SIS 11, and is responsible for communication security. A multi-site coordinator module 35 is responsible for the communication with other site servers. Since SIE 10 supports multi-site implementations, multi-site coordinator module 35 holds all the information for connecting to other SISs.

All the internal operations and tasks are reported to "monitoring & audit" (M&A) modules that store events in a mastered database. On-line monitoring module 41 reports the time and duration of the operation, and eventually, the status (i.e. success or failure). Audit module 42 reports all operations with values for later data-mining and history rollback. SIE modules post events to the M&A modules in asynchronous mode to avoid any effect on system performance and production procedures. Statistics from monitored data is held in a statistics holder 43. Monitoring data is stored in a statistics database 44. Auditing data is stored in an audit database 45. The databases support all known database maintenance procedures, such as cleanup and archiving procedures for reducing the stored amount of data.

Figure 3B:
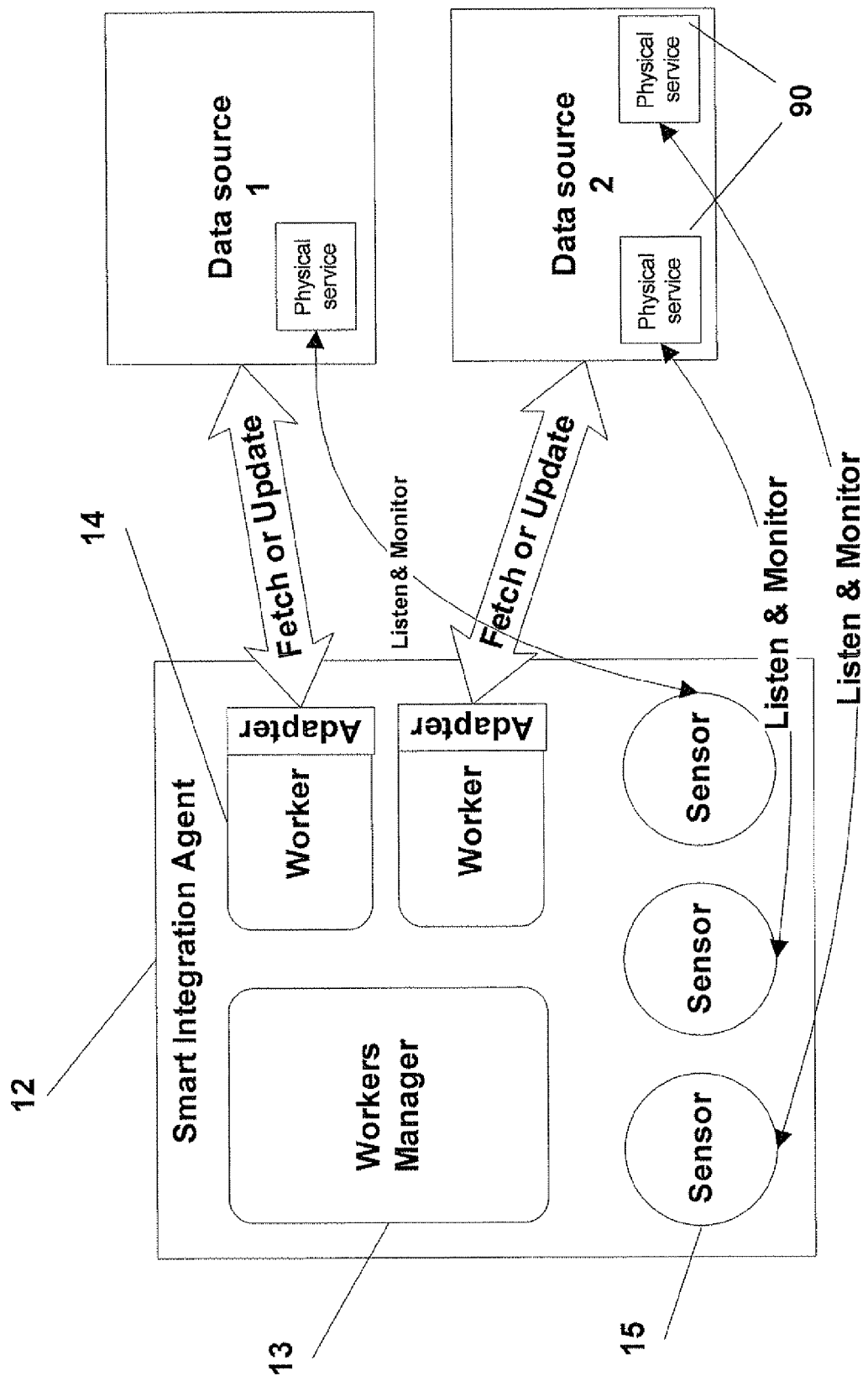
FIG. 3B is a simplified schematic block diagram of the SIA high-level architecture showing the internal modules, according to preferred embodiments of the present invention.

SIE 10 supports several standard tools for viewing and analyzing the monitoring statistics and the audited events (e.g. SNMP). The data providers for this layer are all SIE modules, but the first and most important ones are sensors 15 of SIA 12 (shown in FIG. 3B). Sensors 15 report to M&A modules on all data sources and physical service status.

SIA 12 is a stand-alone lightweight process distributed to the different organization machines for communicating with several different data sources. SIA 12 launches and manages a set of autonomous processes (i.e. SIW 14). Each SIW 14 utilizes adapter 14' for one data-source type. Adapters 14' are responsible for the direct communication with the data sources. SIW 14 is the place where all data-source-related issues are stored (e.g. connection/session polling of the connected user for that data source). SIW 14 also manages a single login connection when it is defined. Executer module 31 provides SIA 12 with packages of queries/calls to be executed. A package holds the following information:

(1) data source name and type (e.g. SQL-DB and web service);

(2) query/call to execute;

(3) requisite data to retrieve from the data source; and (4) inputs and values to be used in the query/call.

Below is an example of a package sent to SIA 12 in XML format (XML format is used as an example for simplicity).

```
<SIE>
    <Config>
        <Datasource>SQL_ORACLE</Datasource>
        <Connection>DSN=CON1;UID=Rob;PWD=Rob;</Connection>
        <Command>Select D from Test where A=?</Command>
    </Config>
    <Output>
        <D DT="datetime"/>
    </Output>
    <Input>
        <A DT="string">'7'</A>
    </Input>
</SIE>
```

The above example shows a package sent to SIA 12 describing the following procedure. Execute Select D from Test where A='7' on Oracle data source with the connection string shown above. In the same package, the data type of the input and output also holds the input the value to be used. The above SELECT statement is provided from the component definition in MDM 38, including the table name (Test). SIA 12 serves as a middle tier between SIWs 14 doing the real work with the data sources, and executer module 31 understanding the execution flow logic. SIA 12 logic is very limited, but the main feature of this module is to execute requests in parallel.

Request aggregation 28 was described above as the aggregation for a number of usages for one data source. In such situations, all such calls are packaged into one call sent to SIA 12. SIA 12 takes the multi-call package, and breaks the package into "pieces" to be executed on the relevant SIW 14. This is an essential function of SIA 12.

SIA 12 also has a discover module that is implemented for each type of data source. This discover module is to be used by discover module 49 in SIS 11. This module discovers and fetches all the data assets of the mastered data source, so the team designer can manage or edit the data assets properly. SIS 11 communicates with SIA 12 using a secured and encrypted binary protocol.

Sensors 15 (FIG. 3B) are the "heartbeat" of physical services 90 which are "wrapped" by MDCs in SIE 10. Using sensors 15, SIE 10 has a continuous and real-time feedback on the data sources and service availability. Once a data source and its services are defined in MDM 38, the team designer can decide whether to automatically test the service periodically, including a scheduler and intervals between tests. By defining the success criteria for such tests (e.g. by defining timeout of the test), such a configuration is applied immediately to sensors 15 for the relevant data source.

Reports from sensors 15 are stored dynamically and independently in the M&A modules. According to report information and the real flow execution, SIE 10 has a full view of the whole organization and data sources to choose better flows and paths to execute the next DSS. As an example, the availability of a data source or a physical service is based on success execution, success validation, latency of execution by its sensor 15, and also based on the real flow execution. So, the team designer defines the weight of availability decision of sensors 15 as a combination of the weight of the real flow execution successes and failures. For instance, designate service as "unavailable" after 3 sensor tests and 20% of the real flow execution has failed within the time of the sensor tests.

After designating service as "unavailable", SIE 10 does not use the service component anymore, and waits for availability again, "listening" to sensor 15 reports. Sensor 15 then continues to test the services with different intervals and policies under certain rules until the service is deemed "available".

From the customer perspective, the most important requests are the following three request types.

(1) Advise: providing the run flow for a required output data structure. Run flow is a chain of components (i.e. services at data sources) and their relevant parameters, representing a solution for the required output query (see FIG. 6A as an example flow).

(2) Run: executing a required query for data-fetch or data-update. The query is built using advisor module 27 according to given input parameters and output schema.

(3) Discover: automatically recognizing the data-asset definitions (metadata) of a specific data source.

Figure 7:
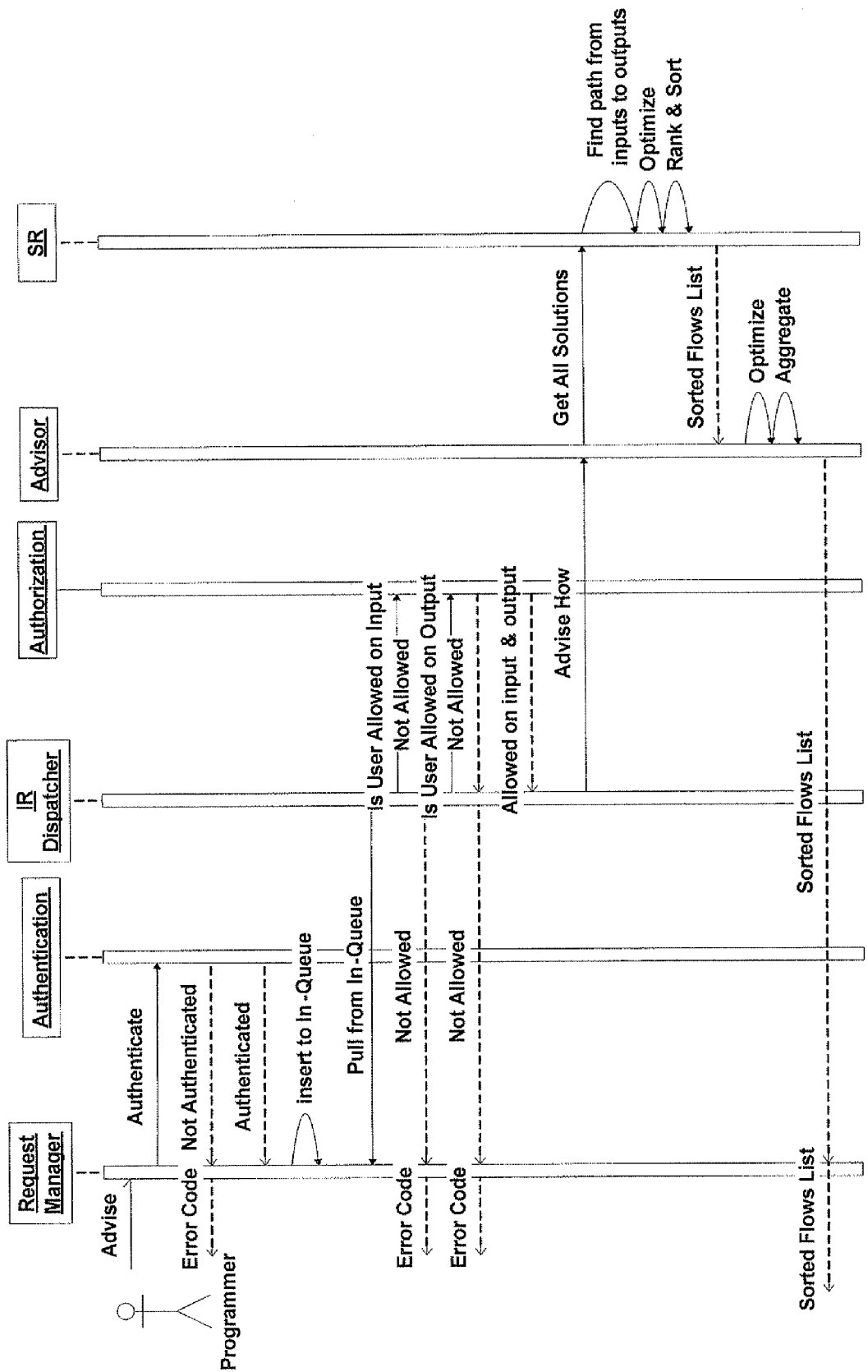
FIG. 7 is a simplified sequence diagram for an advise request, according to preferred embodiments of the present invention.

FIG. 7 is a simplified sequence diagram for an advise request, according to preferred embodiments of the present invention. User (programmer/team designer) posts advise request D to SIE 10. The sequence diagram shown in FIG. 7 is also referred as a "use case" in the art, meaning the steps that capture the functional requirements of the system. RM 21 checks the authentication of the posted user. If not allowed, return to user with error. If allowed, RM 21 inserts advise request D into in-queue module 24. In-request dispatcher module 22 is activated to retrieve advise request D from in-queue module 24. In-request dispatcher module 22 checks the permission of the end user against the message input and output. If not allowed, then return with error. If allowed, raise a thread for advise request D, and call advisor module 27.

Advisor module 27 calls SR 26 to get all flows. SR 26 receives the message, and applies backward-chaining algorithm to find all possible flows (flows that go through "not permitted" MDCs or MDOs are ignored). SR 26 uses MDM 38 to get more information about MDCs and MDOs. SR 26 optimize, ranks, and sorts all flows found. SR 26 returns all flows to the calling advisor module 27. Advisor module 27 uses optimizer 29 to optimize each flow. Optimizer 29 traverses the flow and for each node activates the relevant type. Expert optimizer module 30 converts each node into an executable query/call. When all flows are optimized, advisor module 27 starts each flow aggregation, via request aggregation 28, to find groups of nodes on the same data source or SIA 12. SIE 10 returns a sorted list of aggregated flows by rank.

Figure 8:
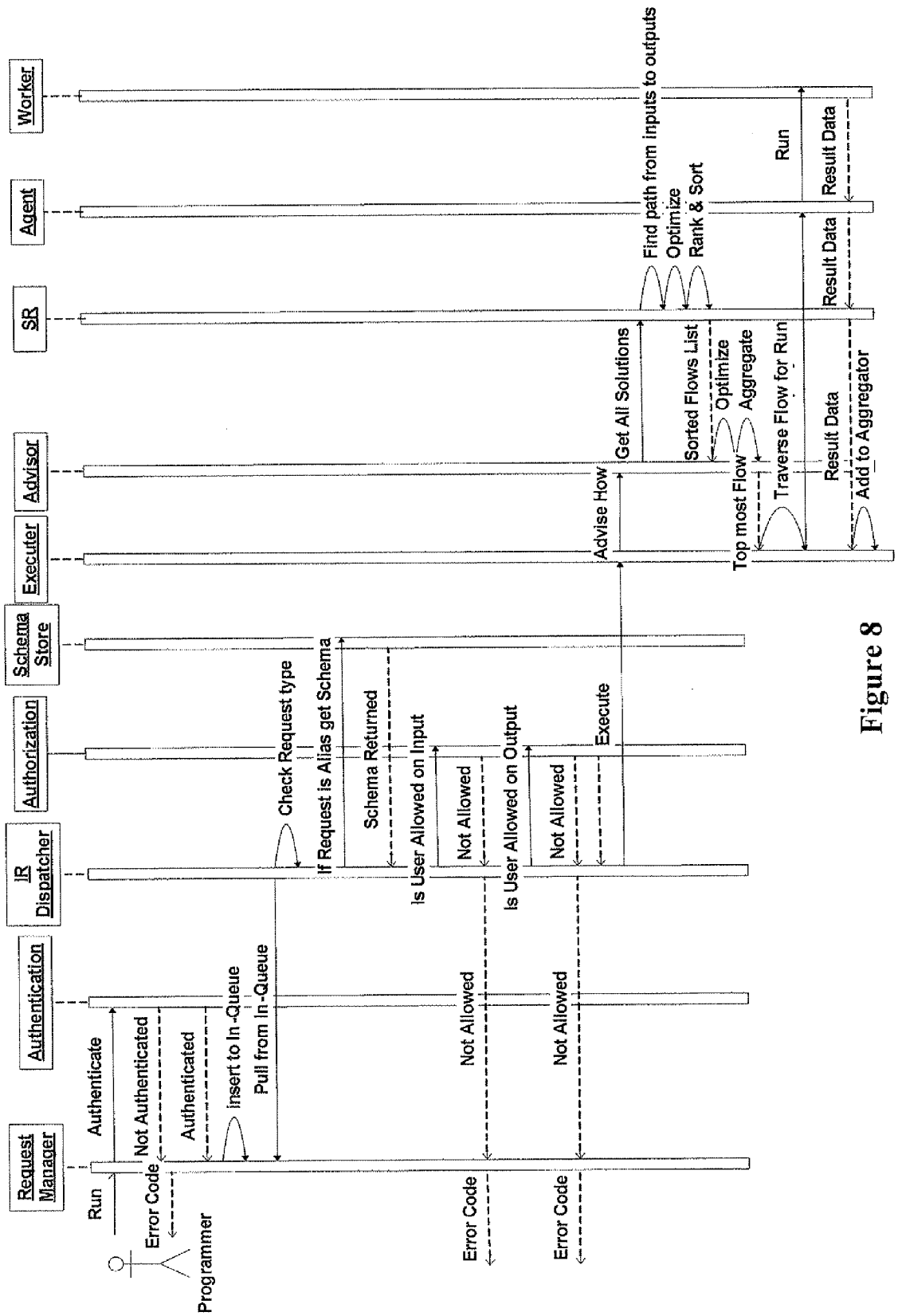
FIG. 8 is a simplified sequence diagram for a run request, according to preferred embodiments of the present invention.

FIG. 8 is a simplified sequence diagram for a run request, according to preferred embodiments of the present invention. FIG. 8 is a use-case scheme. User (programmer/team designer) posts the run message to SIE 10. RM 21 checks the authentication of the posted user. If not allowed, return to user with error. If allowed, RM 21 inserts run request C into in-queue module 24. In-request dispatcher module 22 is activated to retrieve run request C from in-queue module 24. In-request dispatcher module 22 checks the type of run request C. For an alias request, call schema store 39 to get the stored output schema and its input parameters, then pass run request C to executer module 31. For a new request, hold inputs and outputs, then pass the request to executer module 31.

In-request dispatcher module 22 checks the permission of this user on the input and output of run request C. If not allowed, then return with error. If allowed, raise a thread for this request and call executer module 31. Executer module 31 calls advisor module 27 to get the optimal flow. Advisor module 27 calls SR 26 to get all flows. SR 26 gets run request C, and applies backward-chaining algorithm to find all possible flows (flows that go through "not permitted" MDCs or MDOs are ignored). SR 26 uses MDM 38 to get more information about MDCs and MDOs. SR 26 optimizes, ranks, and sorts all flows found. SR 26 returns all flows to calling advisor module 27. Advisor module 27 uses optimizer 29 to optimize each flow. Optimizer 29 traverses the flow and for each node activates the relevant type. Expert optimizer module 30 converts each node into an executable query/call.

The top-most flow is returned to executer module 31 which traverse the flow. For each node at step execute (i.e. call the relevant SIA 12 to run the query/call). SIA 12 "unpacks" the package into smaller packages, and then passes the smaller packages to the relevant SIW 14. SIW 14 executes run request C at the relevant data source, and returns the result data to SIA 12. SIA 12 returns results to executer module 31. Executer module 31 puts results in result aggregator module 33, and continues to the next node.

The discover request sequence progresses as follows. The team designer using SIDA 86 calls administrative API module 25 to discover a data source. The team designer applies the relevant information for the discovery (e.g. IP address and data source type). Administrative API module 25 calls discover module 49 with the data source description. Discover module 49 calls agents manager 50 to find the relevant SIA 12, and activates the discover module of the relevant SIA 12. SIA 12 finds and activates the relevant SIW 14. SIW 14 fetches the data-source assets, and returns the assets to SIA 12, and then to SIS 11.

DSBA 88 is the main helper application of SIE 10 for creating DSS. The main purpose of using this application is to prepare DSS (business-service templates-based metadata), to be used and embedded by various applications within an organization that needs to connect to legacy systems, as shown in FIG. 5.

DSBA 88 exposes the available and authorized metadata to the relevant customers in order to attempt to perform the following operations:

(1) construct new DSS-based metadata;
(2) alter existing DSS;
(3) show possible execution flows (if they exist) for a particular DSS;
  (a) change a flow priority and order;
  (b) in case there are no flows available for the required DSS (given input and required output), the programmer can be assisted by advisor module 27 (advisor module 27 suggests to use more relevant or alternate business input parameters (MDOs) for answering the required request);

(4) decide to which technology the DSS is exported (e.g. web service or messaging);

(5) test and run DSS;

(6) add and save DSS to schema store 39, and identify DSS by alias or by saving the entire dynamic service as one XML file defining the package (the DSS is then confirmed and published by the SIE manager or an authorized entity); and (7) Embed the DSS in client applications 62.

Figure 9:
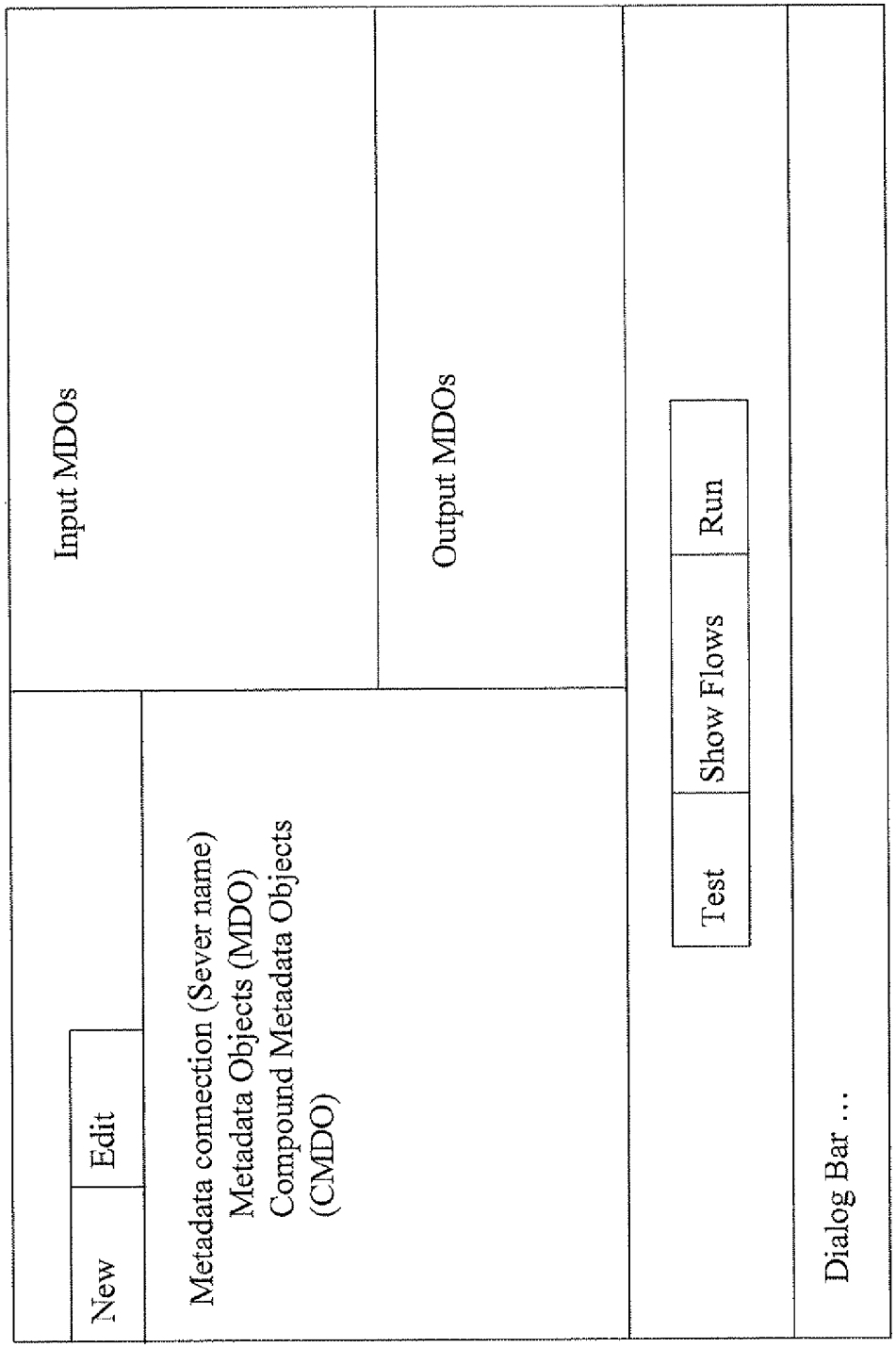
FIG. 9 shows an example of a DSBA form, according to preferred embodiments of the present invention.

FIG. 9 shows an example of a DSBA form, according to preferred embodiments of the present invention. The left side of the form has two tabs, one for creating a new DSS in which the list displays all of the possible MDOs (including all types, containment, and hierarchies), and another tab for editing predefined dynamic services. The right side of the form has two main blocks: input MDOs for the user to define the input parameters and values, which is performed by dragging the MDOs from the left side, and output MDOs for the user to define the required output parameters, also performed by dragging the MDOs from the left side. Finally, the user can view the suggested solutions for such inputs and outputs by using the buttons at the bottom of the form (e.g. test, show flows, and run).

The following are steps describe the programmer workflow on DSBA 88:

(1) connect to metadata;
 (a) connect to SIE 10, this action pops up a connection screen in which the programmer is asked to supply the relevant data such as:
  (i) username;
  (ii) password; and
  (iii) server name or IP address;
 (b) as a result, an authentication and authorization process is performed in order to grant proper access to the programmer;
 (c) once the programmer is connected to the relevant and authorized metadata, metadata nodes appears automatically on the MDOs section (left side of DSBA form shown in FIG. 9);
 (d) manipulate MDOs appearance by using several actions on the metadata nodes:
  (i) view MDOs according to several topics and categories;
  (ii) sort the metadata by categories; and
  (iii) search metadata by keywords;
(2) create DSS;
 (a) build service input based on MDOs;
  (i) input data is represented as an XML tree of MDOs, dragged by the programmer from the MDO list and dropped in the input section; the programmer can construct different input levels:
   (A) flat input, single level of MDOs; and
   (B) complex input, nesting level of MDOs and CMDOs;
  (ii) in addition to building the input by assembling MDOs, the programmer has the ability to manipulate the input in the following way:
   (A) create static XML tags in order to group and title some of the MDOs together; static tags make the input XML clearer and more readable;
   (B) change the MDO access property according to MDO access type; and
   (C) for input MDOs with write-access type, the customer (with the right permission) is able to view all of the related business components (MDCs), add hints, and assign specific MDCs for modifying MDO values;
 (b) build service output based on MDOs;
  (i) output data is represented as an XML tree of MDOs, dragged by the programmer from the MDO list and dropped in the output section; and
  (ii) for read MDOs, all available MDCs appear under each dragged and readable MDOs; permitted programmers can add hints and assign specific MDCs that return MDO values;
 (c) show business flows (solution);
  (i) once the programmer creates the DSS (input/output MDOs), the flows SIE 10 generates can be shown;
  (ii) in case there are no possible flows, the programmer can use advisor module 27 to suggest more relevant and/or alternate MDOs to be added to the input section in order to achieve the required DSS output objects;
  (iii) advisor module 27 is available all the time, even if the programmer has supplied a "legal" and correct input for the output, because advisor module 27 can suggest more efficient and alternate input MDOs;
 (d) test DSS;
  (i) the programmer can supply test values; as a result, the programmer get a report that indicates the following:
   (A) input data;
   (B) output data;
   (C) executed flow; and
   (D) performance statistics over the flow nodes;
  (ii) the programmer can select and choose any available flow other than the default in order to test and examine the DSS;
 (e) save business service;
  (i) save the DSS in SIE 10 identified by an alias in which an administrator or an authorized entity can confirm and publish the DSS accordingly; the confirming or rejecting status of specific MDCs is shown; and
  (ii) the programmer can save the DSS as an XML file containing all the service data.

Some organizations are used to work with well-defined schemas or output formats. Other organizations exchange data in specific schema or templates that are relevant for a given industry. The list of industry standard schema or data formats is constantly growing; every day there is a new schema format.

DSBA 88 gives the team designer the ability to define and store a schema template that can be used later to define a new DSS, just by "filling in the blanks" in the template. Such DSS templates are saved in schema store 39. In addition to this capability, SIE 10 brings predefined templates that are already defined as standards for various industries.

SIDA 86 is a helper application, built for managing MDR 40 in the MDOA. MDR 40 hosts business assets (i.e. logical data), infrastructure metadata (i.e. technology information) such as data-source information, component information, references to the authentication systems (e.g. LDAP), authorization information, business rules, and other integration assets. This metadata serves DSBA 88 in building application queries for querying legacy systems, and serves SIE 10 in building the best component flow solution for executing these queries. Only users designated as a team designer are allowed to work with SIDA 86.

Existing metadata is mainly displayed in DSBA 88 and used by SIE 10. In DSBA 88, MDOs displayed in the list view can be dragged and dropped by the programmers for building dynamic queries accessing legacy data (read/write). DSBA

88 also provides an advanced search engine for searching business data references (MDOs) in the MDO list. In the case that the required metadata is not defined (i.e. does not exist in MDR 40), the programmer sends the needed metadata requirements to the team designer for adding a new MDO.

Before adding new metadata to MDR 40, the team designer confirms that the required metadata does not indeed exist, and assures that the inability of the programmer to see or work on this metadata was not caused by insufficient privileges or an incorrect metadata search. Confirming that the required metadata does not exist, and assuming that the data referenced is part of the legacy system data (or will be part of future data), the team designer adds the MDOs to MDR 40, creating the relevant metadata assets by defining the asset types and the different asset attributes (e.g. data-access type (read/write), validation, and access privileges).

MDOs that are added to the system are inactive (i.e. not visible to SIE 10 and DSBA 88) until the team designer publishes the MDOs. Prior to publishing new metadata, the team designer needs to define the association between the logical MDO (business metadata) and the appropriate physical field (MDF) in the legacy system, or between the logical MDO and a defined mock component for modeling and testing purposes.

Publishing mock metadata for modeling purposes the team designer creates mock data sources and mock components connected to these data sources. Such mock components need to have the same interface (input/output) as future physical services, so that when the relevant physical service is available, it is easy for the team designer to connect the MDO to the actual physical service. Creating mock components can be necessary for modeling and testing, but such mock components cannot provide estimates on performance, scalability, and availability issues. The team designer defines fixed or random test values to be returned from the mock components. In addition, DSBA 88 can request specific returned values within the request document being submitted during the test process.

To publish actual metadata, each physical service has input/output fields that are mapped to MDOs in MDR 40. These fields are defined as physical fields or MDFs. These fields appear only within physical services, and are not presented directly to users. Team designers, together with legacy teams and analyzers, search for the required metadata assets within the existing legacy systems. Mapping the required legacy data, the team designers define the connection to the data sources and services (e.g. queries and stored procedures in databases, web methods in web services, and J2EE components in an application server). Administrators, designers, and legacy teams decide together on the connection mechanism between SIE 10 and the legacy system. This connection becomes the "tunnel" were data is transferred between SIE 10 and the legacy system.

Defining the metadata in MDR 40 can be performed manually or through an automated mechanism. When the team designer decides to discover services metadata (e.g. MDF and MDO) in a specific data source, these data source/services are selected, and the discovery mechanism is initiated. The discovery mechanism initiates a connection to adapter 14', attached to a specific data source via an SIA 12, and starts a discovery process of all the services and their data assets (MDF), mapping the MDFs found to created/suggested MDOs. The discovered metadata is stored in MDR 40.

SIE 10 supports most of the familiar, standard legacy-systems technologies, "out of the box", using standard adapters 14'. SIW 14 communicates with adapters 14' to operate on the different data sources. SIDA 86 connects to SIW 14 for discovering metadata, and executing service testing. Some of the technologies supported include: databases (e.g. MSSQL, ORACLE, DB2, ODBC connections, and JDBC), SAP ERP, Oracle ERP, SIEBEL CRM, web services, J2EE, COM/COM+, .NET assemblies, text files, and memory and lookup tables. Furthermore, SIE 10 provides specific SDK for building custom adapters for non-standard data-source technologies.

As defined in the MDOA, either SIA 12 or SIW 14 is the module installed in the legacy environment (i.e. in the legacy LAN) responsible for receiving execution requests from SIS 11, and redirecting these requests to the appropriate SIW 14 for execution with the relevant data source. Each SIW 14 is defined to communicate with one specific data-source technology (e.g. all databases like Oracle, MSSQL, DB2, and others are accessed through ODBC adapters, web services are discovered and accessed through the WSDL documents, and other non-standard technologies are supported by custom adapters built on top of the SIE SDK). The SDK allows programmers in the organization to write their own adapters for non-standard technologies. According to MDOA definition, SIA 12 information, and all data-source information (e.g. pooling, min/max connections, and sensor 15 information) is saved in MDR 40.

The last step in defining the metadata, before being published, is testing. The team designer tests the combination of MDCs in the system using DSBA 88. DSBA 88 provides the team designer the ability to drag and drop MDOs for building a metadata-based query, supplying test values, and executing the query. The team designer can be advised by SIS 11 of available components flows (i.e. solutions) for the request to SIS 11, execute these solutions, and get performance reports for each component and each flow. As a result, the team designer can decide to make customize queries in order to improve performance, or send the reports to the data-source team or the system database administrator (DBA) in order to improve or create new services.

Once the metadata is created, tested, and tuned to give the best performance and quality information, the metadata can be published to users and applications for use. The publishing process includes assigning user/application authorizations for the different MDOs, and designating MDOs as "published".

For automatically tracking future changes in the discovered databases, a background tracking operation is scheduled. The operation discovers newly-added assets and changes in the already-discovered MDFs. New data-source assets are displayed in a special form in which the assets are sorted by the creation or the discovery date. The team designer views this information, and adds new metadata to MDR 40 by hosting new components in the system, relating component input and output fields to new or existing MDOs. New components added to SIE 10 are plugged in automatically, adding new alternative solutions flows to currently-executed requests. Such a situation can sometimes cause confusion when comparing suggested solutions with executed solutions. In order to avoid confusion, the team designer has the ability to view all of the existing queries in schema store 39, which can be influenced by newly-added components.

The team designer is able to perform a comparison between current solution flows (without adding new MDFs/MDOs), and modified solution flows (with new MDFs/MDOs) for different users requests, checking differences in performance and other parameters. The team designer can send notifications to user programmers or project managers regarding the influence of new solution flows on current requests. User programmers who have decided to choose static flows, continue to use those flows, even though new solutions can provide better performance and data quality. On the other hand, changing data type, deleting MDOs, revoking security privileges, and other drastic changes can cause requests to fail.

The following example is for illustrative purposes only. In no way does the example suggest the limits and bounds of SIE implementations. The implementation of the MDOA concept given two different data sources (a real database and a web service) is described.

Figure 10A:
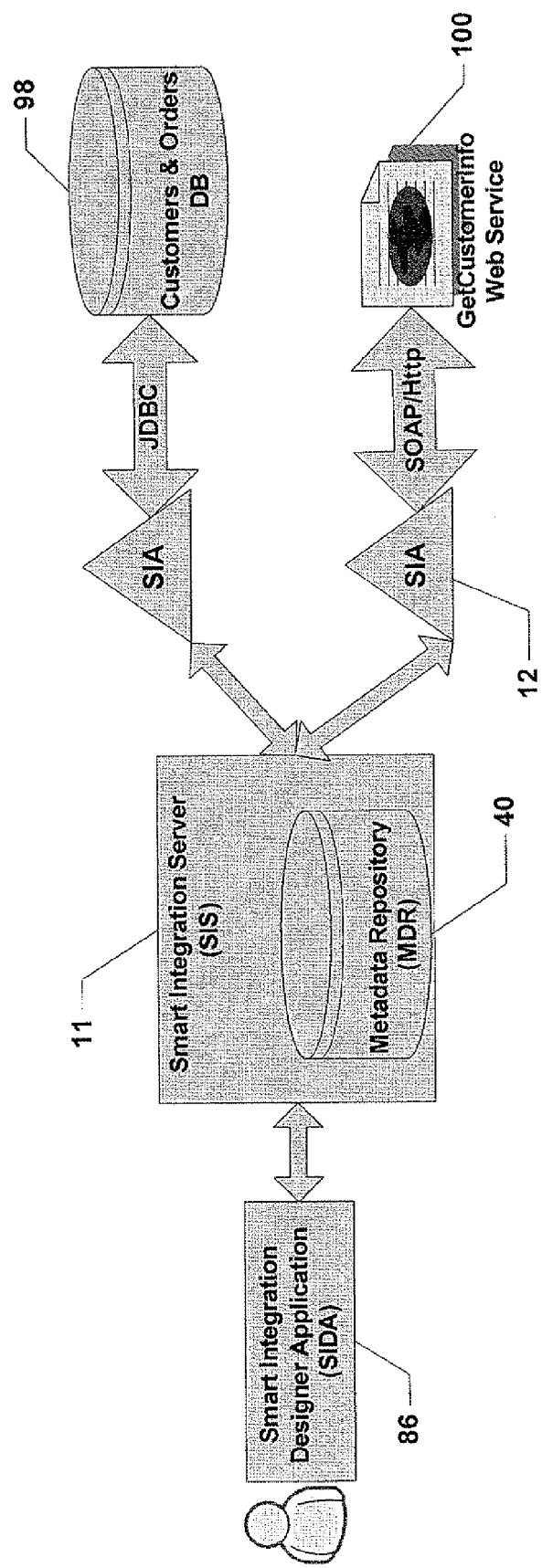
FIG. 10A is a simplified schematic block diagram of an exemplary SIE deployment, according to preferred embodiments of the present invention.
Figure 10B:
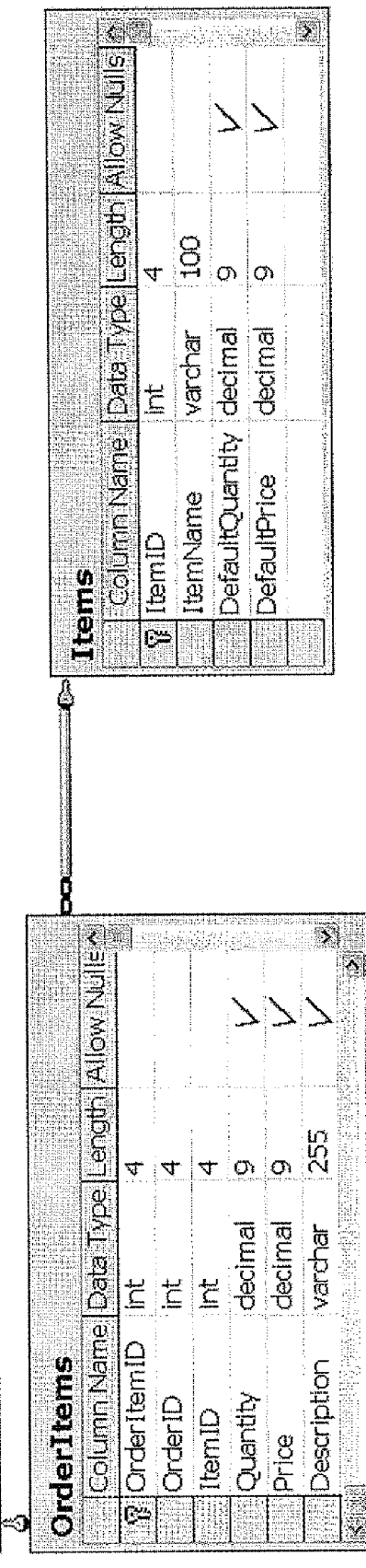
FIG. 10B shows a sample database entity-relationship diagram (ERD) used in the exemplary SIE deployment shown in FIG. 10A, according to preferred embodiments of the present invention.

FIG. 10A is a simplified schematic block diagram of an exemplary SIE deployment, according to preferred embodiments of the present invention. A company's legacy system built from a customer-orders database 98 is shown. MSSQL database 98 holds all customer information with the associated orders. The second data source shown is a web service 100 based on a Customer Relationship Management (CRM) system for handling the most updated information. FIG. 10B shows a sample database entity-relationship diagram (ERD) used in the exemplary SIE deployment shown in FIG. 10A, according to preferred embodiments of the present invention. Database 98 holds the following tables as shown in the ERD in FIG. 10B.

Customers Table
  Indexes
    PK_Customers, Unique (CustomerID)
    ByCustomerName Unique (CustomerName)

Orders Table
  Indexes
    PK_Orders (OrderID)
    ByCustomerAndOrderDate (CustomerID, and OrderDate)

Items Table
  Indexes
    PK_Items, Unique (ItemID)
    ByItemName, Unique (ItemName)

OrderItems Table:
  Indexes
    PK_OrderItems, Unique (OrderItemID)
    ByOrderAndItem, Unique (OrderID, ItemID)
  Relationship constraints between the different tables are as follows:
    Orders and Customers (Orders.CustomerID->Customers.CustomerID)
    OrderItems and Orders (OrderItems.OrderID->Orders.OrderID)
    OrderItems and Items (OrderItems.ItemID->Items.ItemID)

Table 1 shows several stored procedures of the system in the exemplary case.

The DBA of the system has created an "OrdersUser" user, granted "EXEC" privilege (i.e. execute privilege) for that user to all stored procedures, and also set read/write permissions to all tables (even if not necessary, with procedures suffice for accessing the data). The marketing department decides to expose the system via the internet, and to increase system usage. Typically, the IT department decides to develop a new site for such a purpose. In order to make the site fast, the IT department decides that the internet department should establish and maintain the site. The internet project manager asks the business designer to publish all necessary information, including customer information, orders, order items, and item information.

The internet project manager asks the business designer to publish all necessary information, including customer information, orders, order items, and item information.

As mentioned above, the system administrator needs to install SIA 12 with an adequate network connection to the data source (e.g. on the same machine or on a fast LAN connection). When installing a new SIA, the team designer registers and connects the new SIA to SIS 11, and then SIE 10 adds the SIA information to the SIA table. Table 2 shows an example of SIA information for the SIA table in the exemplary case.

TABLE 2

SIA information for the SIA table in the exemplary case.

| | |
|---|---|
| Agent ID = | 1 |
| Agent Name: | DB-Customers-Agent |
| Description: | This agent serves for connecting to Customers information system hosting CustomerOrders and CustomerSupport data source. |
| IP: | 127.0.0.1 |
| Port: | 1234 |
| Encryption: | SSL 3.0 |
| Communication: | Sync-Send-Receive |
| Compression: | gZip |
| Min Connections: | 5 |
| Max Connections: | 30 |

Note that SIE 10 supports synchronous and asynchronous communication with SIA 12 as listed below:
  Sync-Send-Receive (e.g. Web Service, JDBC, Sync MQ)
  A-Sync-Send-Receive (e.g. JMS)

TABLE 1

Several stored procedures of the system in the exemplary case.

| SP Name | Parameters | Description | Return values |
|---|---|---|---|
| GetCustomerByID | CustomerID | Returns customer information | CustomerID, CustomerName, Address |
| GetCustomersByName | CustomerName | Returns customer list filtered like the CustomerName | CustomerID, CustomerName, Address |
| GetItemByID | ItemID | Returns item information using ItemID | ItemID, ItemName, DefaultQuantity, DefaultPrice |
| GetItemsByName | ItemName | Returns item list filtered by the ItemName | ItemID, ItemName, DefaultQuantity, DefaultPrice |
| GetOrderByID | OrderID | Returns order information by OrderID | OrderID, CustomerID, OrderDate, Description |
| GetOrdersByCustomer | CustomerID | Returns order information by CustomerID | OrderID, CustomerID, OrderDate, Description |
| GetOrderItemsByID | OrderItemID | Return specific order item information | OrderItemID, OrderID, ItemID, Quantity, Price, Description |
| GetOrderItems | OrderID | Returns items of a specific order | OrderItemID, OrderID, ItemID, Quantity, Price, Description |

After adding the SIA information, the team designer adds new data-source (i.e. database) information such as data-source type (e.g. MSSQL), connection information, and default timeouts (for connection and query). Adding a new data source causes SIE 10 to generate a new, unique data-source ID in the data-source table in MDR 40. The new data-source ID is sent to SIA 12 with all other information of the database, and SIA 12 stores all information in encrypted form in internal cache. SIS 11 and SIA 12 then communicate using minimal information (e.g. data-source ID).

The team designer connects to the data source via SIA 12 to check the data source. SIS 11 sends a "connect" command (with the data-source ID), and SIA 12 returns the status of the connection. Pooling is supported on two levels: a first-level pool for connection of SIA 12 with the data sources, and a second-level pool for connection of SIA 12 with SIS 11. Minimum and maximum pool sizes are assigned during the declaration of each data source. Default values are available, and depend on the technology of the data source. For example, the minimum connection pooling for MSSQL is 5, and the maximum connection pooling for MSSQL is 30. Table 3 shows the data-source information (i.e. metadata) in the data-source table stored by SIS 11 in the exemplary case.

TABLE 3

Metadata of the data-source table in the exemplary case.

| | |
|---|---|
| Data Source Name: | 100_CUSTOMERORDERS |
| Data Source ID = | 100 |
| Type: | Relational DB |
| Sub-Type: | MSSQL |
| Vendor: | Microsoft |
| IP: | 127.0.0.1 |
| Min Connections: | 5 |
| Max Connections: | 30 |
| Connection String: | Provider = SQLOLEDB.1; Integrated Security = SSPI; Persist Security Info = False; Initial Catalog = CustomerOrders; Data Source =. |
| User Name: | OrdersUser |
| Password (Encrypted): | a@entu$er |
| SSL: | none |
| Agent: | 100 |

The team designer clicks the discover button (i.e. activates discover module 49) in SIDA 86, causing SIS 11 to send a discover request to SIA 12. SIA 12 returns a list of all the above procedures with its input parameters, output dataset definitions, tables list, indexes, list of fields, and relationships (i.e. foreign keys) for each table. Discover module 49 receives the returned list from SIA 12, and creates a list of corresponding MDCs as below. Table 4 shows a list of MDCs created by discover module 49 in the exemplary case.

TABLE 4

MDCs created by the discover module in the exemplary case.
Component ID = 1
Component Name: C_1_CUSTOMERS_DS100
Data Source ID = 100
Priority = 1

| | | Inputs | | | |
|---|---|---|---|---|---|
| Physical Field | ■ | Mapped to MDO | Unique? | Update? | Test Value |
| CustomerID | Int | MT_CUSTOMERID | Yes | No | 1, 20, 55 |

TABLE 4-continued

MDCs created by the discover module in the exemplary case.
Component ID = 1
Component Name: C_1_CUSTOMERS_DS100
Data Source ID = 100
Priority = 1

| | Outputs | | |
|---|---|---|---|
| Physical Field | ■ | Mapped to MDO | Unique |
| CustomerID | Int | MT_CUSTOMERID | |
| CustomerName | String | MT_CUSTOMRNAME | |
| CustomerAddress | String | MT_CUSTOMERADDRESS | |

All MDFs defined in Table 4 are stored in the "Physical Fields" table, and refer to the MDC with ID=1. Tables 5-7 show three MDOs created in the exemplary case.

TABLE 5

An MDO created in the exemplary case.
Meta Data Object #1000
Name = MT_CUSTOMERID
ID = 10000

| | |
|---|---|
| Display Name | Customer Identifier |
| Type | Int |
| Access Type | Read |
| Description | Customer identifier, Unique, from 1 . . . 100000 |
| Enabled | Yes |
| Published | No |
| Permission | Internet User (read) |
| Test Values | 1, 20, 50 (random) |

TABLE 6

An MDO created in the exemplary case.
Meta Data Object #1001
Name = MT_CUSTOMERNAME
ID = 10001

| | |
|---|---|
| Display Name | Customer Name |
| Type | String |
| Access Type | Read |
| Description | Customer Name, Unique |
| Enabled | Yes |
| Published | No |
| Permission | Internet User (read) |
| Test Values | Ronaldino, Maradona, Zedo (random) |

TABLE 7

An MDO created in the exemplary case.
Meta Data Object #1002
Name = MT_CUSTOMERADDRESS
ID = 10002

| | |
|---|---|
| Display Name | Customer Address |
| Access Type | Read |
| Type | String |
| Description | Customer Address |
| Enabled | Yes |
| Published | No |
| Permission | Internet User (read) |
| Test Values | 13 Rubenio St. |

In addition, a new MDO #1003 with name "MT_CUSTOMERS_INFO" is automatically created. MT_CUSTOMERS_INFO is composed of all the above MDOs (MDOs #1000-1002 shown in FIGS. 5-7), and encapsulates all output MDOs of the C_1_CUSTOMERS_DS100 component. Table 8 shows MDO #1003 created in the exemplary case.

TABLE 8

MDO #1003 created in the exemplary case.
Meta Data Object #1003
Name = MT_CUSTOMERS_INFO
ID = 10003

| | |
|---|---|
| Display Name | Customers Information |
| Type | Complex |
| Children | MT_CUSTOMERID |
| | MT_CUSTOMERNAME |
| | MT_CUSTOMERADDRESS |
| Access Type | Read |
| Description | Customer Information which includes all information about specific customer |
| Enabled | Yes |
| Published | No |
| Permission | Internet User (read) |
| Test Values | (1, "Ronaldino", "13 Rubenio St.") |

Other created MDOs include:
*MT_ORDERID *MT_ORDERS_ORDERDATE
*MT_ITEMID *MT_ORDERS_DESCRIPTION
*MT_*ITEMS_NAME *MT_ORDERITEMS_QUANTITY
*MT_ORDERITEMS_PRICE *MT_ORDERITEMS_DESCRIPTION
*MT_ITEMS_DEFAULTPRICE *MT_ITEMS_DEFAULTQUANTITY
Other created CMDOs include:
*MT_ORDERS_INFO: contains all "Orders" MDOs
*MT_ORDERITEMS_INFO: contains all "OrderItems" MDOs
*MT_ITEMS_INFO: contains all "Items" MDOs
Other created MDCs include:
C_2_CUSTOMERS_DS100
   According to ByCustomerName index
   Input: MT_CUSTOMERNAME
   Output: All Customer MDOs
C_GetCustomersByName_SP_1
   According to GetCustomersByName Stored Procedure
   Input: MT_CUSTOMERNAME
   Output: All Customer MDOs
C_GetCustomersByName_SP_2
   According to GetCustomersByName Stored Procedure
   Input: MT_CUSTOMERNAME
   Output: MT_CUSTOMER_INFO
Note that the component calls the same stored procedure, but returns a complex MDO that includes all details of a specific customer. Such an arrangement is meant to simplify the query process, and to publish atomic information on a specific issue.
C_1_ORDERS_DS100
   According to PK_Orders
   Input: MT_ORDERID
   Output: MT_ORDERID, MT_CUSTOMERID, MT_ORDERS_ORDERDATE, MT_ORDERS_DESCRIPTION
C_2_ORDERS_DS100
   According to ByCustomerAndDate index
   Input: MT_CUSTOMERID->CustomrID, MT_ORDERS_ORDERDATE->OrderDate
Output: All fields of Orders
   C_GetOrderByID_SP_1
     According to GetOrderByID Stored Procedure
     Input: MT_ORDERID->OrderID
     Output: All Order info details
   C_GetOrderByID_SP_2
     According to GetOrderByID Stored Procedure
     Input: MT_ORDERID->OrderID
     Output: MT_ORDERS_INFO)
C_1_ORDERITEMS_DS100
   According to PK_OrderItems Index
   Input: MT_ORDERITEMID->OrderItemID
   Output: All OrderItems MDOs
C_2_ORDERITEMS_DS100
   According to ByOrderAndItem Index
   Input: MT_ORDERID, MT_ITEMID
   Output: All OrderItems MDOs
Note that MT_CUSTOMERID, MT_ORDERS, and MT_ITEMID are used in more than one component.

In addition to automatic discovery of the data source, and component generation, the team designer can add new components based on a query. Such new components can get parameters and return datasets (the parameter placeholders are designated by the "$" mark within the query). To demonstrate the query-builder capability, the team designer adds a new component called "GetOrderItemsFullDetails" with the following query:

```
"SELECT
    OI.OrderID, OI.ItemID, I.ItemName, OI.Descrition,
    OI.Quantity,
    OI.Price, I.DefaultQuantity, I.DefaultPrice
FROM
    OrderItems OI
INNER JOIN
    Item I On OI.ItemID=I.ItemID
WHERE
    OI.OrderID=$OrderID"
```

As shown above, the new component gets an "OrderID" parameter, and returns eight MDOs that already have been defined within the automatic discovery. The team designer only needs to refer the newly-created component inputs and outputs to the existing MDOs.

The team designer can move to a new data source that holds more information about a customer, and is located in a CRM system. The information needed from the new data source is the most-recent customer-information details (e.g. CustomerName, Address, Telephones and last calls). The CRM system publishes a web service with one web method called "GetCustomerInfo". The web method receives CustomerID (an integer parameter), and returns CustomerName, Address, and Telephones. The team designer installs a new local SIA 12, activates the web services adapter 14' on that SIW 14, adds a new data source called CRM_DS (as described in the previous database data source), connects to the WSDL, adds a new component called C_CRM_DS_GETCUSTOMERINFO, and refers all input and output parameters to the existing predefined MDOs (except Telephones).
   CustomerID is mapped to the MT_CSUTOMERID MDO
   CustomerName is mapped to MT_CUSTOMERNAME MDO
   CustomerAddress is mapped to MT_CUSTOMERADDRESS MDO
   Telephone is defined as MT_CUSTOMERTELEPHONE MDO The team designer knows that CRM information is the most-commonly updated information, so the priority value is set on each MDF of the C_CRM_DS_GETCUSTOMERINFOR MDC output parameters (causing SIE 10 to preferentially select this component when searching flows using MDOs associated with this MDF).

The team designer is also able to define individual priority values to a user or an application on the MDC. If such a priority value has been defined, the general priority is overridden, and specific users/applications get the same information from different data sources.

Such a priority feature is essential for performance issues. When requesting CustomerName information, SIE 10 then gets information from the C_CRM_DS_GETCUSTOMER-INFO component (directed by the high-priority MDF). If that component fails, SIE 10 retrieves information from an alternative data source (i.e. CustomerOrders). The team designer is also able to statically declare the exact (or the only) data source for retrieving MDO information for specific user/application.

When both data sources (i.e. database 98 and web service 100 in the exemplary case) are hosted in SIE 10, the team designer is able to add user/application information (specifying rules, priorities, and security information), making MDR 40 hold all requisite metadata for execution and DSS building via DSBA 88.

For example, the programmer can use DSBA 88 to build a DSS for retrieving the customer items from database 98 and the customer address from web service 100. The next DSS can be built by simply dragging the customer ID MDO to the input area of DSBA 88, and the customer ID, customer name, customer address, and items MDOs to the output area of DSBA 88. As mentioned above, the programmer can add static tags to the DSS to group some MDOs for simplifying the returned data. In the exemplary case, the programmer creates a "Customer Information" static tag to hold the customer ID, customer name, and customer address MDOs as shown below.

```
<SIE>
    <Inputs>
        <MT_ITEMID />
    </Inputs>
    <Outputs>
        <Customer_Information>
            <MT_CUSTOMERID />
            <MT_CUSTOMERNAME />
            <MT_CUSTOMERADDRESS />
        </Customer_Information>
        <MT_ITEMID />
    </Outputs>
</SIE>
```

Now applications can use this DSS to get the list of items IDs and the customer address of a specific customer (when the Customer ID is needed) by filling in the value of the Customer ID in the input tag. Note that the static tag <Customer_Information> is used which is not part of the metadata and used by the programmer just for nesting the XML and simplifying the parsing process. In general, SIE 10' resolves the solution flow of this DSS by using MT_CUSTOMERID on both systems in which the programmer fetches the customer name and address from web service 100, and fetches the items IDs from customer-orders database 98.

Any changes in either data sources can influence the execution. New components can influence the same queries within client application 62, but usually will not change the requested DSS structure. A simple example of such sensitivity is changing priority of a client application in order to retrieve MT_CUSTOMERNAME from customer-orders database 98. Such a change will not improve performance because other information has not been set yet to be retrieved from that data source. By requesting these MDOs, the system will retrieve from both data sources.

Other client applications, which are allowed to update customer information, can update both data sources automatically only by sending an update DSS request for the customer information MDOs (as explained in DSBA 88 and SIE 10).

While the invention has been described with respect to a limited number of embodiments, it will be appreciated that many variations, modifications, and other applications of the invention may be made.

What is claimed is:

1. A method for automatically generating data-service-execution flows, based on metadata objects, for executing data services from heterogeneous data sources, the method comprising the steps of:
   (a) providing a smart integration engine, having at least one smart integration server with a solution resolver residing therein, configured to receive dynamic service schema (DSS) requests, said DSS requests each having a DSS metadata input and a DSS metadata output, for executing the data services from the heterogeneous data sources, wherein said solution resolver has access to data assets stored in a metadata repository; and
   (b) generating solution flows of said DSS requests based on metadata criteria and on said data assets, each said solution flow utilizes a plurality of nodes that are interrelated such that a node output of a preceding node serves as a node input of a subsequent node for producing said DSS metadata output, a portion of said plurality of nodes to be executed subsequent to said step of generating said solution flows according to an optimized node sequence determined by said solution resolver solely during said step of generating said solution flows.

2. The method of claim 1, the method further comprising the step of:
   (c) optimizing said solution flows based on client-defined criteria, on said metadata criteria, and on said data assets, said step of optimizing based on at least one optimization parameter selected from the group consisting of: a data quality, a node quantity, a solution-execution response time, and a data-source quantity.

3. The method of claim 1, the method further comprising the step of:
   (c) aggregating common data-source requests into a request bundle to be sent for execution from a specific data source.

4. The method of claim 1, the method further comprising the step of:
   (c) sending internal requests, based on said solution flows, to smart integration agents for executing data from the data sources.

5. The method of claim 4, the method further comprising the steps of:
   (d) discovering new data sources using said agents; and
   (e) modifying said solution flows based on said new data sources.

6. The method of claim 4, wherein said agents include sensors for monitoring status information of the data sources.

7. The method of claim 6, the method further comprising the step of:
   (d) modifying said solution flows based on said status information.

8. The method of claim 6, wherein said status information includes at least one item selected from the group consisting of: a data-source availability, a data-source validity, and an execution performance.

9. The method of claim 4, wherein said agents include smart integration workers for operationally connecting to the data sources.

10. The method of claim 9, wherein said workers include adapters for facilitating an operational connection to the data sources.

11. The method of claim 1, the method further comprising the step of:
(c) recovering from incomplete-request faults during execution, upon said incomplete-request faults occurring, by:
(i) generating sub-flows of alternate data sources for incomplete-request elements of said incomplete-request faults; and
(ii) executing an optimized sub-flow.

12. The method of claim 1, the method further comprising the step of:
(c) storing said DSS requests and user-defined requests and previously executed requests in a schema store for faster execution via alias calls and/or web services.

13. The method of claim 1, the method further comprising the steps of:
(c) before generating said solution flows, verifying said DSS requests are allowed to be executed by a client application; and
(d) upon failing to obtain verification, ignoring said DSS requests in said step of generating said solution flows.

14. The method of claim 1, the method further comprising the step of:
(c) monitoring said DSS requests to obtain execution information.

15. The method of claim 14, the method further comprising the step of:
(d) using said execution information in order to determine a subsequent optimized node sequence for a subsequent DSS request.

16. The method of claim 14, wherein said execution information includes at least one item selected from the group consisting of: an execution time, an execution duration, and an execution status.

17. The method of claim 14, the method further comprising the step of:
(d) auditing said execution information for use in obtaining a history rollback and/or to search said execution information.

18. The method of claim 1, the method further comprising the step of:
(c) triggering an operation upon execution of a designated request.

19. The method of claim 1, the method further comprising the step of:
(c) automatically updating the data sources upon executing update DSS requests.

20. The method of claim 1, the method further comprising the step of:
(c) modeling execution of the data services using said solution flows, said modeling being performed using mock metadata and mock components associated with mock data sources in order to evaluate said solution flows.

21. The method of claim 1, the method further comprising the step of:
(c) aggregating returned data values from all the data sources into a single DSS response according to a DSS metadata output format.

22. The method of claim 1, wherein said metadata criteria include at least one criterion selected from the group consisting of: a priority rule, a data-source availability, a data quality, a number of request steps, a data-source validity, and an execution performance.

23. The method of claim 1, wherein said metadata repository includes technical metadata and business metadata, wherein said technical metadata provide data-source information for executing said DSS requests, and wherein said business metadata represent said technical metadata in business terms.

24. The method of claim 23, wherein said technical metadata and business metadata include metadata selected from the group consisting of: metadata objects, metadata components, metadata fields, compound metadata objects, organizational information, site information, data-source information, metadata object-metadata field (MDO-MDF) association information, metadata object-metadata object (MDO-MDO) association information, metadata field-metadata field (MDF-MDF) association information, association transformation information, security, permission privilege information, policy information, validation information, and data-schema alias information.

25. The method of claim 1, wherein said optimized node sequence is obtained using a backward-chaining algorithm.

26. The method of claim 1, wherein said solution flows exclude previously-executed nodes from previous DSS requests.

27. A computer-readable storage medium having computer-readable code embodied on the computer-readable storage medium, the computer-readable code comprising:
(a) smart-integration-engine (SIE) program code for enabling a smart integration engine to execute a solution flow, said solution flow based on metadata objects;
(b) smart-integration-server (SIS) program code for enabling a smart integration server to receive at least one dynamic service schema (DSS) request, said DSS requests each having a DSS metadata input and a DSS metadata output, for executing data services from heterogeneous data sources;
(c) metadata-repository (MDR) program code for enabling a metadata repository to have at least one data asset that serves as an input for said solution flow; and
(d) solution-resolver (SR) program code for enabling a solution resolver to generate said solution flow of said at least one DSS request based on metadata criteria and said at least one data asset, said solution flow utilizes a plurality of nodes that are inter-related such that a node output of a preceding node serves as a node input of a subsequent node for producing said DSS metadata output, a portion of said plurality of nodes to be executed subsequent to generate of said solution flow according to an optimized node sequence determined by said solution resolver solely during said generation of said solution flow.

* * * * *

UNITED STATES PATENT AND TRADEMARK OFFICE
CERTIFICATE OF CORRECTION

PATENT NO.         : 7,580,946 B2                                         Page 1 of 1
APPLICATION NO.    : 11/836164
DATED              : August 25, 2009
INVENTOR(S)        : Rabia Mansour et al.

It is certified that error appears in the above-identified patent and that said Letters Patent is hereby corrected as shown below:

On the Title Page

Assignee Item (73) should be corrected as follows:
change
--Bizweel Ltd., Ramle (IL)--
to
"Bizwheel Ltd., Ramle (IL)"

Signed and Sealed this

First Day of December, 2009

David J. Kappos
*Director of the United States Patent and Trademark Office*